(12) United States Patent
Ishikawa et al.

(10) Patent No.: US 10,877,607 B2
(45) Date of Patent: Dec. 29, 2020

(54) LAMINATED BASE MATERIAL, COVER GLASS, TOUCH PANEL, AND METHOD FOR MANUFACTURING LAMINATED BASE MATERIAL

(71) Applicant: TORAY INDUSTRIES, INC., Tokyo (JP)

(72) Inventors: Akihiro Ishikawa, Otsu (JP); Mitsuhito Suwa, Otsu (JP); Chika Hibino, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 266 days.

(21) Appl. No.: 15/542,529

(22) PCT Filed: Jan. 12, 2016

(86) PCT No.: PCT/JP2016/050642
§ 371 (c)(1),
(2) Date: Jul. 10, 2017

(87) PCT Pub. No.: WO2016/117407
PCT Pub. Date: Jul. 28, 2016

(65) Prior Publication Data
US 2018/0264778 A1    Sep. 20, 2018

(30) Foreign Application Priority Data

Jan. 19, 2015   (JP) .................................. 2015-007472

(51) Int. Cl.
*B32B 7/02*   (2019.01)
*G06F 3/044*   (2006.01)
(Continued)

(52) U.S. Cl.
CPC ................ *G06F 3/044* (2013.01); *B32B 7/02* (2013.01); *B32B 27/08* (2013.01); *B32B 27/16* (2013.01); *B32B 27/20* (2013.01); *B32B 27/283* (2013.01)

(58) Field of Classification Search
CPC ......... B32B 27/08; B32B 27/16; B32B 27/20; B32B 27/283; B32B 7/02; G06F 3/044
See application file for complete search history.

(56) References Cited

U.S. PATENT DOCUMENTS 5,444,329 A * 8/1995 Matsuda ................. G02B 1/115
313/479
5,932,309 A * 8/1999 Smith ........................ C08J 3/20
428/46
(Continued)

FOREIGN PATENT DOCUMENTS

JP    2008188996 A    8/2008
JP    2013008272 A    1/2013
(Continued)

OTHER PUBLICATIONS

JP-2013254116-A Machine Translation (Year: 2013).*
(Continued)

*Primary Examiner* — Travis M Figg
(74) *Attorney, Agent, or Firm* — Ratnerprestia

(57) ABSTRACT

The present invention is aimed at providing a laminated base material capable of conveniently attaining the enhancement in lightness of a decorating layer without requiring a thickened film thickness and an increased number of complicated steps. The present invention provides a laminated base material including a substrate (A), and a layer (B) and a layer (C) sequentially laminated on a surface of the substrate (A), wherein a refractive index nA of the substrate (A) and a (Continued)

refractive index nB of the layer (B) satisfy the relationship of $0.6 \geq nA-nB \geq 0.1$, and the layer (C) contains a pigment.

9 Claims, 3 Drawing Sheets

(51) Int. Cl.
- *B32B 27/08* (2006.01)
- *B32B 27/16* (2006.01)
- *B32B 27/20* (2006.01)
- *B32B 27/28* (2006.01)

(56) References Cited

U.S. PATENT DOCUMENTS

| | | | | |
|---|---|---|---|---|
| 2007/0207307 A1* | 9/2007 | Yoneyama | B32B 23/12 | 428/313.5 |
| 2008/0113165 A1* | 5/2008 | Watanabe | G02F 1/133502 | 428/212 |
| 2008/0176973 A1* | 7/2008 | Qiu | B32B 27/30 | 523/135 |
| 2008/0309635 A1* | 12/2008 | Matsuo | G06F 3/0443 | 345/173 |
| 2010/0053101 A1* | 3/2010 | Nozawa | G02B 1/111 | 345/173 |
| 2010/0326501 A1* | 12/2010 | Zhao | B32B 15/20 | 136/252 |
| 2011/0216029 A1* | 9/2011 | Jin | C08J 7/123 | 345/173 |
| 2012/0113021 A1* | 5/2012 | Liu | G06F 3/0446 | 345/173 |
| 2012/0285528 A1* | 11/2012 | Takanohashi | C09D 5/18 | 136/256 |
| 2014/0004331 A1* | 1/2014 | Hida | B32B 7/12 | 428/220 |
| 2014/0024868 A1* | 1/2014 | Lai | B01J 37/0045 | 585/267 |
| 2014/0333996 A1* | 11/2014 | Saito | G02B 5/282 | 359/359 |
| 2014/0368757 A1* | 12/2014 | Chen | G06F 3/044 | 349/12 |

FOREIGN PATENT DOCUMENTS

| | | | |
|---|---|---|---|
| JP | 2013152639 A | | 8/2013 |
| JP | 2013254116 A | * | 12/2013 |
| JP | 2013254116 A | | 12/2013 |
| JP | 2014078218 A | | 5/2014 |
| JP | 2015118280 A | | 6/2015 |
| JP | 2016009304 A | | 1/2016 |

OTHER PUBLICATIONS

Titanium dioxide PubChem.*
International Search Report and Written Opinion for International Application No. PCT/JP2016/050642, dated Apr. 5, 2016—5 Pages.
Chinese Office Action for Chinese Application No. 201680005542.5, dated Sep. 18, 2018, with translation, 17 pages.
Zhiwei, Z., "Prism Reflected Light Technology and Engineering Applications," Mar. 2009, National Defense Industry Press, Beijing, Series of Books on Modern Optical Technologies, 9 pages, with translation.

* cited by examiner

10,877,607 B2

LAMINATED BASE MATERIAL, COVER GLASS, TOUCH PANEL, AND METHOD FOR MANUFACTURING LAMINATED BASE MATERIAL

CROSS REFERENCE TO RELATED APPLICATIONS

This is the U.S. National Phase application of PCT/JP2016/050642, filed Jan. 12, 2016, which claims priority to Japanese Patent Application No. 2015-007472, filed Jan. 19, 2015, the disclosures of these applications being incorporated herein by reference to their entireties for all purposes.

TECHNICAL FIELD OF THE INVENTION

The present invention relates to a laminated base material, a cover glass, a touch panel, and a method for manufacturing a laminated base material.

BACKGROUND OF THE INVENTION

In recent years, mobile equipment, such as smartphones and tablet PCs, in which a capacitance type touch panel is used, has rapidly come into widespread use. In the capacitance type touch panel, it is common that a pattern of ITO (indium tin oxide) film is formed in a screen area and a metal wire portion made of molybdenum or the like is further formed at the periphery of the screen area. In order to blind the metal wire portion so as not to be visually confirmed by a user, a white or black decorating layer, which also plays a role of a light-shielding layer, is formed at the periphery of the base material, namely, the cover glass inner surface, of the capacitance type touch panel.

Systems of a capacitance type touch panel are broadly divided into an out-cell system in which a touch panel layer is formed between a cover glass and a liquid crystal panel, an on-cell system in which a touch panel layer is formed on a liquid crystal panel, an in-cell system in which a touch panel layer is formed within a liquid crystal panel, and an OGS (one glass solution) system in which a touch panel layer is directly laminated and formed on a cover glass, and the systems have been diversified. However, even in any one of the systems, a pattern of a white color-based decorating layer such as a pure white one and a so-called pastel-colored one in which the hue is finely adjusted is required to be high in visible light reflectivity in spite of being a thin film and to be high in lightness from an aspect of imparting a high-grade feeling to a product as a cover glass or a cover glass-integrated type touch panel to enhance the value of the product. As a technique for enhancing the lightness of a decorating layer, there has been proposed a laminated constitution in which the surface of a white color-based resin layer formed on a surface of a transparent base material is covered with a thin metal film being made of aluminum, chromium, molybdenum, or the like and high in reflecting properties, instead of thickening the film thickness of a layer, causing the processability of a pattern to be deteriorated and causing the pattern to become unsatisfactory in shape (Patent Documents 1 to 3).

PRIOR ART DOCUMENTS

Patent Documents

Patent Document 1: Japanese Patent Laid-open Publication No. 2013-152639

Patent Document 2: Japanese Patent Laid-open Publication No. 2013-8272

Patent Document 3: Japanese Patent Laid-open Publication No. 2014-78218

BRIEF SUMMARY OF THE INVENTION

However, there has been a limit to the effect obtained by forming a thin metal film on the surface of a white color-based decorating layer, and furthermore, extremely high production costs have been required because steps of vacuum vapor deposition, film-forming by a sputtering method, etching, resist-removing, and the like become necessary.

On that account, the present invention is aimed at providing a laminated base material capable of conveniently attaining the enhancement in lightness of a decorating layer without requiring a thickened film thickness and an increased number of complicated steps.

The present inventors made earnest investigations, and consequently they found out that lightness of a decorating layer visually confirmed by a user is dramatically enhanced by forming a layer with a refractive index difference between the layer and a base material lying within the range of 0.1 to 0.6 between the base material and the decorating layer.

According to the laminated base material of the present invention, it is possible to noticeably enhance the lightness of a decorating layer visually confirmed by a user, using a convenient method, while keeping the decorating layer in a thin film state.

DETAILED DESCRIPTION OF CERTAIN EMBODIMENTS OF THE INVENTION

Figure 1:
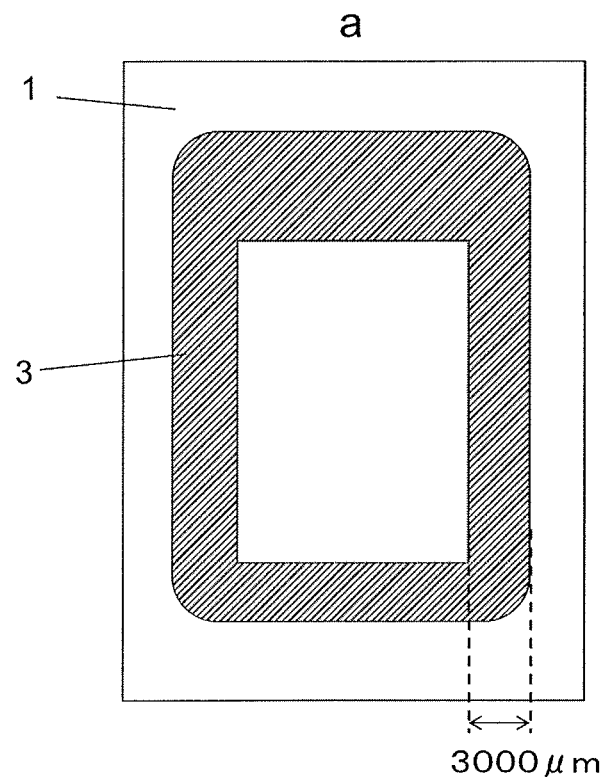
FIG. 1 is a schematic illustration showing a laminated base material of the present invention viewed from a layer (C) side.

The laminated base material of the present invention is characterized in that a layer (B) and a layer (C) are sequentially laminated on a surface of a substrate (A), a refractive index nA of the substrate (A) and a refractive index nB of the layer (B) satisfy the relationship of $$0.6 \geq |nA-nB| \geq 0.1$$

and the layer (C) contains a pigment. As described below, |nA−nB| represents an absolute value of a refractive index difference at a wavelength of 632.8 nm.

The substrate (A) refers to a plate-like or sheet-like member with a surface on which a layer (B) and a layer (C) are formed to be laminated. As a kind of material quality of the substrate (A), in consideration of using a laminated base material of the present invention in a touch panel application or the like, a kind of material quality that transmits light in a visible light region within the wavelength range of 380 to 800 nm is preferred. A kind of material quality that makes the total light transmittance per 0.1 mm in thickness (based on JIS K7361-1) 80% or more is more preferred, and a kind of material quality that makes the refractive index lie within the range of 1.30 to 2.10 is further preferred.

Examples of such a kind of material quality include glass, an acrylic resin, a polyester resin, polycarbonate, polyarylate, polyethersulfone, polypropylene, polyethylene, polyimide, and a cycloolefin polymer. Glass, an acrylic resin, a polyester resin, polycarbonate, or a cycloolefin polymer being high in transparency to light in a visible light region is preferred, and glass being high in durability is more preferred. Examples of a kind of glass include soda glass, aluminosilicate glass, a kind of glass prepared by subjecting each of those to thermally strengthening treatment or chemically strengthening treatment, sapphire, and the like. Chemically strengthened glass which has been widely used as a cover glass of a touch panel is preferred.

In this context, the chemically strengthened glass refers to a kind of glass in which, for example, some of sodium ions on a glass surface are substituted with potassium ions by a chemical treatment to enhance mechanical properties such as hardness. In view of balance between the strength and the lightness, a thickness of a sheet of chemically strengthened glass is preferably 0.4 to 2.0 mm, and more preferably 0.5 to 1.0 mm. When being less than 0.4 mm, there is a case where the glass becomes liable to break when a user drops a device equipped with a laminated base material, a cover glass, or a touch panel of the present invention on the ground, and when being more than 2.0 mm, there is a case where visible light absorption of the chemically strengthened glass itself adversely affects the lightness.

A substrate (A) is measured for its refractive index by being irradiated with light with a wavelength of 632.8 nm (a He—Ne laser), emitted in a direction perpendicular to the surface of the substrate (A), namely, the face at a side on which a layer (B) is formed, under atmospheric pressure and under the condition of 20° C. using a prism coupler (for example, PC-2000 (manufactured by Metricon CORPORATION)), and a value of the refractive index is rounded off to the second decimal place to decide a refractive index nA of the substrate (A).

On a surface of a substrate (A), a layer (B) is formed. As in the case of the refractive index nA of the substrate (A), a layer (B) is irradiated with light with a wavelength of 632.8 nm, emitted in a direction perpendicular to the surface of the layer (B), and a value of its refractive index is rounded off to the second decimal place to decide a refractive index nB of the layer (B).

|nA−nB| representing an absolute value of a refractive index difference is decided by being rounded off to the first decimal place.

As long as the relationship of 0.6≥|nA−nB|≥0.1 can be satisfied, either of refractive indexes nB of the layer (B) higher and lower than the refractive index nA of the substrate (A) is acceptable. Furthermore, in the point that the reflection chromaticity of a laminated base material and the refractive index difference are easily controlled, it is more preferred that the relationship of nB<nA be satisfied.

A refractive index nB is preferably 1.20 to 1.40, and more preferably 1.20 to 1.35. When the refractive index nB is less than 1.20, the porosity of a layer (B) is excessively increased due to voids formed for making the refractive index nB low, and there is a case where the layer (B) is made sparse or dense and adhesion to the substrate (A) is lowered. On the other hand, when the refractive index nB is more than 1.40, there is a case where enhancement in lightness of a layer (C) visually confirmed from a surface of a substrate (A) at a side opposite to the lamination (hereinafter, referred to as "an opposite face of a substrate (A)") becomes insufficient.

In this connection, with regard to a laminated base material of the present invention in which a layer (B) and a layer (C) are laminated on a surface of a substrate (A), in the case of determining a refractive index nB of the layer (B), an area where a layer (B) portion being a portion of an intermediate layer is exposed, namely, an area on which a layer (C) is not laminated, of the laminated base material can be measured therefor. When a pattern of the layer (B) is formed by photolithography, a screen printing method, or the like and there is no area where a layer (B) portion is exposed, by any one of a method of cleaving a laminated base material in an oblique direction and a method of subjecting a laminated base material to polishing treatment from a vertical direction against the substrate (A) to remove a layer (C) portion, a layer (B) portion can be exposed to determine a refractive index nB of the layer (B) using a prism coupler or an ellipsometer (for example, FE-5000 (manufactured by Otsuka Electronics Co., Ltd.)).

In the case of using a laminated base material of the present invention in a cover glass-integrated type touch panel, a thickness of the layer (B) is preferably 0.1 to 3.0 μm, and more preferably 0.2 to 1.5 μm. The thickness of the layer (B) can be measured by a stylus type step profiler (for example, SURFCOM 1400D manufactured by TOKYO SEIMITSU CO., LTD.). When the thickness of the layer (B) is less than 0.1 μm, there is a case where enhancement in lightness of a layer (C) visually confirmed from an opposite face of a substrate (A) becomes insufficient. On the other hand, since the production process of a cover glass-integrated type touch panel presupposes that a plurality of times of high temperature treatment processes at 220 to 250° C. are included therein, when the thickness of the layer (B) is more than 3.0 μm, loss of reflected light due to light absorption becomes impossible to be ignored even if yellowing of the layer (B) is slight, and as a result thereof, there is a case where an effect of enhancing the lightness becomes insufficient.

In view of controlling the refractive index nB of a layer (B) to a refractive index at a lower side than the refractive index nA of a substrate (A), namely, attaining a lowered refractive index of a layer (B), it is preferred that the layer (B) contain a kind of silicon dioxide. In this context, the silicon dioxide refers to a kind of silica being a substance constituted of silicon dioxide.

As respective kinds of silicon dioxide, hollow silica fine particles having voids in the inside of the particle, colloidal silica in which the secondary flocculation state is controlled, porous silica fine particles, and the like are preferred. When a layer (B) contains these kinds of silicon dioxide, many fine voids are formed in the inside of the layer (B) and it becomes possible to reduce the refractive index nB of the layer (B) to a refractive index lying within the range of 1.20 to 1.40. With regard to primary particles of a kind of silicon dioxide, in order to enhance the light transmitting property, a maximum width of the primary particle is preferably 10 to 100 nm, and more preferably 10 to 50 nm, and it is further preferred that the primary particle have a spherical shape.

A proportion occupied by silicon dioxide in the layer (B) is preferably 30 to 95% by mass, and more preferably 50 to 80% by mass. When the proportion of silicon dioxide is less than 30% by mass, there is a case where enhancement in lightness of a layer (C) visually confirmed from an opposite fade of a substrate (A) becomes insufficient. On the other hand, when the proportion of silicon dioxide is more than 95% by mass, there is a case where processability in forming a layer (B) is deteriorated.

On the other hand, conversely, in view of controlling the refractive index nB of a layer (B) to a refractive index at a higher side than the refractive index nA of a substrate (A), namely, attaining a heightened refractive index of a layer (B), it is preferred that the layer (B) contain metal oxide particles with a high refractive index. In particular, zirconium oxide and titanium dioxide are more preferred. With regard to primary particles, in order to enhance the light transmitting property, a maximum width of the primary particle is preferably 10 to 100 nm, and more preferably 10 to 50 nm, and it is further preferred that the primary particle have a spherical shape.

Nanoparticle powder as a commercially available product can be used, and examples thereof include UEP-100 (zirconium oxide manufactured by Daiichi Kigenso Kagaku Kogyo Co., Ltd.) and STR-100N (titanium dioxide manufactured by Sakai Chemical Industry Co., Ltd.). Moreover, metal oxide particles can also be supplied as a dispersion. Examples of a silicon dioxide-titanium dioxide dispersion include "OPTOLAKE" (registered trademark) TR-502, "OPTOLAKE" TR-503, "OPTOLAKE" TR-504, "OPTOLAKE" TR-513, "OPTOLAKE" TR-520, "OPTOLAKE" TR-527, "OPTOLAKE" TR-528, "OPTOLAKE" TR-529, "OPTOLAKE" TR-544, and "OPTOLAKE" TR-550 (all manufactured by JGC Catalysts and Chemicals Ltd.). Examples of a zirconium oxide dispersion include BIRAL Zr-C20 (average particle diameter=20 nm; manufactured by Taki Chemical Co., Ltd.), ZSL-10A (average particle diameter=60-100 nm; manufactured by Daiichi Kigenso Kagaku Kogyo Co., Ltd.), NanoUse OZ-30M (average particle diameter=7 nm; manufactured by Nissan Chemical Industries, Ltd.), SZR-K (manufactured by Sakai Chemical Industry Co., Ltd.), and HXU-120JC (manufactured by Sumitomo Osaka Cement Co., Ltd.).

A proportion occupied by a metal oxide with a high refractive index in the layer (B) is preferably 30 to 95% by mass, and more preferably 50 to 80% by mass. When the proportion of the metal oxide with a high refractive index is less than 30% by mass, there is a case where enhancement in lightness of a layer (C) visually confirmed from an opposite face of a substrate (A) becomes insufficient. On the other hand, when being more than 95% by mass, there is a case where processability in forming a layer (B) is deteriorated.

Furthermore, on a surface of the layer (B), a layer (C) containing a pigment is formed. That is, on a surface of the substrate (A), a layer (B) and a layer (C) are sequentially laminated. If the lamination order of the layer (B) and the layer (C) is reversed at all, an effect of enhancing the lightness fails to be attained, and by interposing the layer (B) between the substrate (A) and the layer (C), the effect is developed.

In this context, by making a refractive index nA of the substrate (A) and a refractive index nB of the layer (B) satisfy the relationship of $0.6 \geq |nA-nB| \geq 0.1$, it is possible to noticeably enhance the lightness of the layer (C) visually confirmed from an opposite face of a substrate (A), namely, an interface between the layer and the air.

When a value of $|nA-nB|$ is more than 0.6, a reflected light amount at an opposite face of the substrate (A) becomes large, and in the case of being used as a cover glass, a cover glass-integrated type touch panel, or the like, the visibility in a display part is deteriorated. On the other hand, when a value of $|nA-nB|$ is less than 0.1, a refractive index difference between the substrate (A) and the layer (B) becomes insufficient, and enhancement in lightness of a layer (C) visually confirmed from an opposite face of the substrate (A) fails to be attained.

In this context, lightness refers to $L^*$ being a coordinate that indicates the lightness among three coordinates constituting the reflection chromaticity ($L^*$, $a^*$, $b^*$) under measurement conditions of standard light source D65, viewing angle 2° (CIE 1976), atmospheric pressure, and 20° C. The lower limit value of $L^*$ is 0, the upper limit value thereof is 100, and the larger the value is, the higher the lightness is.

The layer (C) contains a pigment. The pigment referred to herein means particles of an organic substance or an inorganic substance which reflects and/or absorbs light in a visible light region to show hues. The shape thereof may be a spherical shape, a plate-like shape, a flaky shape, or an unspecified shape, and it does not matter whether or not the pigment has solubility against a solvent.

In the case of forming a white color-based decorating layer, it is preferred that the pigment contained in the layer (C) be a white pigment. In this context, the white pigment refers to an opaque pigment which does not have a specific absorption in a visible light region and has a large refractive index. Examples of the white pigment include titanium dioxide, magnesium oxide, barium sulfate, zirconium oxide, zinc oxide, and white lead. Titanium dioxide, which is excellent in visible light reflectivity, is high in chemical stability, and is easily industrially used, is preferred. Examples of a crystal structure of the titanium dioxide include an anatase type, a rutile type, and a brookite type. Rutile type titanium dioxide, which has a high refractive index and is low in catalytic activity, is preferred. Above all, a kind of titanium dioxide produced by a chlorine method, which contains few colored impurities attributed to the production method and is high in whiteness, is more preferred, and a kind of surface-treated titanium dioxide is further preferred from the viewpoints of dispersibility, lightfastness, and heat resistance.

As a surface treating material with which titanium dioxide is surface-treated, a metal oxide or a hydrate of a metal oxide is preferred, and a material prepared by adding silica or zirconia to alumina is more preferred. Above all, from the viewpoint of lightfastness and heat resistance, a material prepared by adding silica to alumina is further preferred. In order to retain visible light reflectivity, a proportion occupied by a surface treating material in the surface-treated titanium dioxide particle is preferably 10% by mass or less.

In order to enhance visible light reflectivity of the layer (C), an average primary particle diameter of the titanium dioxide used as the white pigment is preferably 0.1 to 0.5 μm, and more preferably 0.2 to 0.3 μm. In this context, the average primary particle diameter refers to a number average of primary particle diameters measured by a particle size measuring method using an image analysis type particle size distribution measuring apparatus. A transmission electron microscope (TEM) can be used to photograph an image, and the average primary particle diameter is calculated from an image in which 100 or more of primary particles are photographed.

A proportion occupied by a white pigment in the layer (C) is preferably 20 to 80% by mass, and more preferably 40 to 70% by mass. When the proportion of the white pigment is less than 20% by mass, there is a case where enhancement in lightness of a layer (C) visually confirmed from an opposite face of a substrate (A) becomes insufficient. On the other hand, when being more than 80% by mass, there is a case where processability in forming a layer (C) is deteriorated, adhesion to the layer (B) is lowered, or insufficient strength of a film is caused.

When a layer (C) contains a coloring material (compound having a specific absorption in a visible light region) other than the white pigment, it becomes possible to form a layer (C) showing various hues such as red hue, blue hue, and violet hue, namely, a decorating layer.

Examples of the coloring material include dyes, organic pigments, and inorganic pigments. Organic pigments or inorganic pigments, which are excellent in lightfastness, are preferred.

Examples of the organic pigment include yellow organic pigments such as Pigment Yellow-12, 13, 17, 20, 24, 83, 86, 93, 95, 109, 110, 117, 125, 129, 137, 138, 139, 147, 148, 150, 153, 154, 166, 168, and 185; orange organic pigments such as Pigment Orange-13, 36, 38, 43, 51, 55, 59, 61, 64, 65, and 71; red organic pigments such as Pigment Red-9, 48, 97, 122, 123, 144, 149, 166, 168, 177, 179, 180, 192, 209, 215, 216, 217, 220, 223, 224, 226, 227, 228, 240, and 254; violet organic pigments such as Pigment Violet-19, 23, 29, 30, 32, 37, 40, and 50; blue organic pigments such as Pigment Blue-15, 15:3, 15:4, 15:6, 22, 60, and 64; green organic pigments such as Pigment Green-7, 10, 36, and 58; and black organic pigments such as carbon black, perylene black, and aniline black. The numerical values each indicate a color index (C.I. number). Pigment Blue 15:3, Pigment Blue 15:4, Pigment Blue 15:6, Pigment Green 7, Pigment Green 36, and carbon black, which are excellent in versatility and heat resistance, are more preferred. For the purpose of enhancing the dispersibility, these organic pigments may be subjected to surface treatment such as rosin treatment, acid group treatment, or basic treatment.

Examples of the inorganic pigment include metal oxides, composite oxides, metal nitrides, and metal acid nitrides, such as iron oxide, titanium nickel antimony, titanium nickel barium, chromium oxide, cobalt (II) aluminate, and titanium nitride. These inorganic pigments may be surface-treated with another inorganic component or organic component. In the case of forming a white color-based decorating layer, in order to retain visible light reflectivity, a proportion of the organic pigment and inorganic pigment to the white pigment contained in the layer (C) is preferably 50 to 5000 ppm (mass ratio).

An average particle diameter of the coloring material is preferably 1 µm or less, and more preferably 0.01 to 0.3 µm.

It is preferred that a refractive index nC2 of a white pigment excluding the surface treating material in the layer (C), a refractive index nC1 of other components excluding the whole pigment in the layer (C), and a refractive index nB of the layer (B) satisfy the relationships of $$nC1 < nC2 \text{ and}$$

$$nB < nC1.$$

It is preferred that three coordinates constituting the reflection chromaticity (L*, a*, b*) under measurement conditions of standard light source D65, viewing angle 2° (CIE 1976), incident angle 8°, atmospheric pressure, and 20° C. satisfy the relationships of 70≤L*≤99, −5≤b*≤5, and −5≤a*≤5, respectively, and it is more preferred that the three coordinates satisfy the relationships of 80≤L*≤99, −2≤b*≤2, and −2≤a*≤2, respectively.

A thickness of the layer (C) is preferably 1 to 40 µm, more preferably 10 to 20 µm, and further preferably 15 to 18 µm. As in the case of the layer (B), the thickness of the layer (C) can be measured by a stylus type step profiler. When the thickness of the layer (C) is less than 1 µm, there is a case where an electrode wire can be seen therethrough to be visually confirmed by a user even if the layer (C) is a black color-based one extremely high in light-shielding properties per thickness as compared with a white color-based one. On the other hand, when the thickness of the layer (C) is more than 40 µm, there is a case where the thickness adversely affects the processability in forming a layer (C), and the like. Moreover, due to the limit of a light scattering ability of the white pigment and poor light absorbing properties of the white pigment itself, the lightness L* is not enhanced endlessly in proportion to the thickness of a layer (C), and there is a tendency for the lightness to be almost saturated after the lightness reaches a constant value. Accordingly, in the case where heightened lightness is required particularly in view of design, a laminated base material of the present invention can be used to conveniently attain a value of lightness more than a saturated value of lightness.

The layer (C) corresponds to a so-called decorating layer. As such, the layer (C) needs only to be formed only in a decorative area of the substrate (A), and does not need to be formed in a display area of the substrate (A). And then, it is sufficient for a layer (B) to be formed in the same area as that in which a layer (C) is formed because the layer (B) is provided for the purpose of attaining the enhancement in lightness of the layer (C) visually confirmed from an opposite face of the substrate (A) As described above, it is preferred that a layer (B) and a layer (C), which constitute a prescribed pattern, be formed only in a decorative area of the substrate (A).

As a method of forming such a pattern, photolithography (hereinafter, referred to as "a photolithography step") being excellent in resolution and pattern edge linearity is preferred. A photolithography step includes an application step of applying a photosensitive resin composition on a base material to obtain a coating film and a pattern formation step of exposing the coating film to light and developing the exposed film to obtain a desired pattern. That is, it is preferred that a method for manufacturing the laminated base material of the present invention include a photolithography step of using a photosensitive resin composition to form a layer (B) mentioned above.

Examples of a method of applying a photosensitive resin composition in the application step include a slit coating method, a spin coating method, a gravure coating method, a spray coating method, an inkjet printing method, and a screen printing method. A slit coating method, a spin coating method, or a screen printing method being excellent in film thickness uniformity is preferred.

A coating film obtained in the application step may be pre-baked at a temperature of 60 to 150° C. for 30 seconds to 3 minutes with use of a heating device such as a hot plate, an oven, or the like.

A coating film obtained in the application step is irradiated with exposure light through a mask with which a desired pattern is obtained to be exposed to light. Examples of an exposure machine with which a film is irradiated with exposure light include a stepper, a mirror projection mask aligner (MPA), and a parallel light mask aligner (hereinafter, referred to as "PLA"). It is common for the intensity of exposure light to lie within the range of 10 to 4000 J/m$^2$ (converted to an exposure amount at a wavelength of 365 nm). Moreover, examples of an exposure light source include ultraviolet light such as i-ray, g-ray, or h-ray, KrF (wavelength: 248 nm) laser, ArF (wavelength: 193 nm) laser, and the like.

For example, in the case where a photosensitive resin composition used is a negative type one, after the exposure, only an unexposed portion is dissolved to be developed. With regard to the development, it is preferred that a coating film after exposed be immersed in a developer for 5 seconds to 10 minutes by a method such as showering, dipping, or paddling.

Examples of the developer include high-concentration developers such as a 2.38% by mass aqueous solution of tetramethylammonium hydroxide (TMAH) and a 4% by mass choline aqueous solution which are alkali developers industrially used, and low-concentration developers such as a 0.4% by mass TMAH aqueous solution, a 0.2% by mass TMAH aqueous solution, a 0.045% by mass potassium hydroxide aqueous solution, a 1% by mass sodium hydrogen carbonate aqueous solution, a 0.2% by mass sodium hydrogen carbonate aqueous solution, and a 0.1% by mass sodium hydroxide aqueous solution. From an aspect of securing a higher developing property and a processing margin of the developing time, each of these developers may be mixed with a commercially available surfactant.

A pattern obtained in the pattern formation step may be heated at a temperature of 120 to 250° C. for 15 minutes to 2 hours with use of a heating device such as a hot plate, an oven, or the like.

As a photosensitive resin composition used for formation of each of the layer (B) and the layer (C), a negative type one is preferred because the negative type one is excellent in resolution characteristics and a developing property and capable of suppressing yellowing of the pattern.

As a resin contained in a photosensitive resin composition used for formation of each of the layer (B) and the layer (C), a polysiloxane and/or an acrylic resin, which are/is hardly colored and excellent in processability in the pattern formation step, are/is preferred. That is, it is preferred that the layer (B) contain a polysiloxane and/or an acrylic resin. Moreover, it is preferred that the layer (C) contain a polysiloxane and/or an acrylic resin.

Moreover, in the case of controlling the refractive index nB of a layer (B) to a refractive index at a lower side than the refractive index nA of a substrate (A), namely, attaining a lowered refractive index of a layer (B), it is preferred that a photosensitive resin composition used for formation of the layer (B) (hereinafter, referred to as "composition (B)") contain a compound having a fluorine atom in its structure, and it is more preferred that the composition (B) contain a polysiloxane or acrylic resin having a fluorine atom in its structure.

On the other hand, in the case of controlling the refractive index nB of a layer (B) to a refractive index at a higher side than the refractive index nA of a substrate (A), namely, attaining a heightened refractive index of a layer (B), it is preferred that the composition (B) contain a cardo resin.

For example, a polysiloxane is obtained by hydrolysis and dehydration condensation of an alkoxysilane compound.

Examples of the alkoxysilane compound as the raw material of the polysiloxane include methyltrimethoxysilane, methyltriethoxysilane, ethyltrimethoxysilane, ethyltriethoxysilane, propyltrimethoxysilane, propyltriethoxysilane, isobutyltrimethoxysilane, isobutyltriethoxysilane, cyclohexyltrimethoxysilane, cyclohexyltriethoxysilane, 3-isocyanatepropyltriethoxysilane, 3-aminopropyltrimethoxysilane, 3-aminopropyltriethoxysilane, 3-ureidopropyltrimethoxysilane, 3-ureidopropyltriethoxysilane, tetramethoxysilane, tetraethoxysilane, silicate 51 (tetraethoxysilane oligomer) trimethylmethoxysilane, triphenylmethoxysilane, acryloxypropyltrimethoxysilane, methacryloxypropyltrimethoxysilane, 3-trimethoxysilylpropylsuccinic anhydride, 3-triethoxysilylpropylsuccinic anhydride, 3-dimethylmethoxysilylpropylsuccinic anhydride, 3-dimethylethoxysilylpropylsuccinic anhydride, 3-trimethoxysilylpropylcyclohexyl dicarboxylic anhydride, trifluoroethyltrimethoxysilane, trifluoroethyltriethoxysilane, trifluoroethyltripropoxysilane, trifluoroethyltriisopropoxysilane, trifluoroethyltributoxysilane, trifluoroethyltriacetoxysilane, trifluoropropyltrimethoxysilane, trifluoropropyltriethoxysilane, trifluoropropyltripropoxysilane, trifluoropropyltriisopropoxysilane, and trifluoropropyltriacetoxysilane. In order to enhance resolution characteristics and a developing property in the pattern forming step, it is preferred that an alkoxysilane compound having a carboxyl group or acid anhydride group being an alkali-soluble group be used.

For example, an acrylic resin is obtained by a copolymerization of a (meth)acrylic compound.

Examples of the (meth) acrylic compound as the raw material of the acrylic resin include (meth)acrylic acid, (meth)acrylic anhydride, itaconic acid, itaconic anhydride, mono(2-acryloyloxyethyl) succinate, mono(2-acryloyloxyethyl) phthalate, mono(2-acryloyloxyethyl) tetrahydrophthalate, methyl (meth)acrylate, ethyl (meth)acrylate, propyl (meth)acrylate, cyclopropyl (meth)acrylate, cyclopentyl (meth)acrylate, cyclohexyl (meth)acrylate, cyclohexenyl (meth)acrylate, 4-methoxycyclohexyl (meth)acrylate, 2-cyclopropyloxycarbonylethyl (meth)acrylate, 2-cyclopentyloxycarbonylethyl (meth)acrylate, 2-cyclohexyloxycarbonylethyl (meth)acrylate, 2-cyclohexenyloxycarbonylethyl (meth)acrylate, 2-(4-methoxycyclohexyl)oxycarbonylethyl (meth)acrylate, norbornyl (meth)acrylate, isobonyl (meth)acrylate, tricyclodecanyl (meth)acrylate, tetracyclodecanyl (meth)acrylate, dicyclopentenyl (meth)acrylate, adamantyl (meth)acrylate, adamantylmethyl (meth)acrylate, 1-methyladamantyl (meth)acrylate, glycidyl (meth)acrylate, α-ethylglycidyl (meth)acrylate, α-n-propylglycidyl (meth)acrylate, α-n-butylglycidyl (meth)acrylate, 3,4-epoxybutyl (meth)acrylate, 3,4-epoxyheptyl (meth)acrylate, α-ethyl-6,7-epoxyheptyl (meth)acrylate, and benzyl methacrylate. In order to enhance resolution characteristics and a developing property in the pattern forming step, it is preferred that a (meth)acrylic compound having a carboxyl group or acid anhydride group being an alkali-soluble group be used.

As the cardo resin, a commercially available product can be preferably used, and examples thereof include OGSOL (registered trademark) CR-TR1, CR-TR2, CR-TR3, CR-TR4, CR-TR5, or CR-TR6 (hereinabove, manufactured by Osaka Gas Chemicals Co., Ltd.) and the like.

In order to enhance the patternability in the photolithography step, it is preferred that a photosensitive resin composition used for formation of each of the layer (B) and the layer (C) (hereinafter, referred to as "composition (B)" or "composition (C)") contain a polyfunctional monomer.

As the polyfunctional monomer, a polyfunctional compound having a (meth)acrylate group, in which the reactivity, the solubility, the double bond equivalent and the like can be appropriately selected, namely, a (meth)acrylate compound, is preferred. Moreover, in order to attain a lowered refractive index of a layer (B), it is preferred that the composition (B) contain a (meth)acrylate compound having a fluorine atom in its structure.

Examples of the polyfunctional (meth)acrylate compound include 1,4-butanediol di(meth)acrylate, 1,5-pentanediol di(meth)acrylate, 1,6-hexanediol di(meth)acrylate, 1,9-nonanediol di(meth)acrylate, tricyclododecane di(meth)acrylate, pentaerythritol tetra(meth)acrylate, dipentaerythritol hexa(meth)acrylate, dipentaerythritol penta(meth) acrylate, tripentaerythritol hepta(meth)acrylate, tripentaerythritolocta(meth)acrylate, a succinic acid adduct of pentaerythritol tri(meth)acrylate, a succinic acid adduct of dipentaerythritolpenta(meth)acrylate, 2-(perfluorohexyl) ethyl (meth)acrylate, a mixture of isocyanuric acid-EO-modified triacrylate and isocyanuric acid-EO-modified diacrylate (average number of EO units=3), trimethylolpropane-PO-modified triacrylate (average number of PO units=3), trimethylolpropane-EO-modified triacrylate (average number of EO units=3), and 2-(perfluorobutyl)ethyl (meth)acrylate. In this context, EO represents ethylene oxide and PO represents propylene oxide.

For example, it is preferred that the above-mentioned polyfunctional (meth)acrylate compound be a photopolymerization initiator. The photopolymerization initiator refers to a compound which is decomposed or reacted by light (including ultraviolet light and electron beams) to produce radicals.

Examples of the photopolymerization initiator include 2-methyl-1-(4-methylthiophenyl)-2-morpholinopropan-1-one, 2-benzyl-2-dimethylamino-1-(4-morpholinophenyl)-butan-1-one, 2-(dimethylamino)-2-[(4-methylphenyl) methyl]-1-[4-(4-morpholinophenyl)-butan-1-one, 2,4,6-trimethyl benzoyl phenyl phosphine oxide, bis(2,4,6-trimethylbenzoyl)-phenyl phosphine oxide, bis(2,6-dimethoxybenzoyl)-(2,4,4-trimethylpentyl)-phosphine oxide, 1,2-octanedione, 1-[4-(phenylthio)-2-(O-benzoyloxime)], ethanone,1-[9-ethyl-6-(2-methylbenzoyl)-9H-carbazol-3-yl]-, 1-(O-acetyloxime), 2,2-dimethoxy-1,2-diphenylethan-1-one, and 1-hydroxy-cyclohexyl-phenyl-ketone. In order to suppress coloring of each of the layer (B) and the layer (C), acylphosphine oxide-based photopolymerization initiators, such as 2,4,6-trimethylbenzoylphenylphosphine oxide, bis(2,4,6-trimethylbenzoyl)-phenylphosphine oxide, and bis(2,6-dimethoxybenzoyl)-(2,4,4-trimethylpentyl)-phosphine oxide, are preferred.

When a proportion occupied by a compound having a fluorine atom in its structure in the composition (B) becomes excessively high, there is a case where cissing, defective leveling or the like occurs at the time of formation of a layer (B). However, surface tension of the composition (B) can be appropriately adjusted by modifications of the kind of a leveling agent and the addition amount thereof depending on surface energy of a substrate (A) used and a method of applying a composition (B) to solve these problems. Examples of the leveling agent include fluorochemical surfactants, silicone-based surfactants, polyalkylene oxide-based surfactants, and poly(meth)acrylate-based surfactants.

A composition (B) containing silicon dioxide can be used to make a layer (B) formed contain the silicon dioxide. It is preferred that a dispersion of silicon dioxide particles be used at the time of preparing a composition (B) containing silicon dioxide. As such a dispersion, a sol type dispersion or the like produced by a build-up method or a dispersion in which silicon dioxide is dispersed by a breakdown method using a disperser such as a bead mill can also be used other than commercially available dispersions. In the point that a film after curing can be provided with fine voids and this enables a lowered refractive index of a layer (B) to be attained, it is preferred that hollow silica sol and porous silica sol be used singly or in combination thereof. Moreover, in order to further stabilize the dispersion state, it is especially preferred that silicon dioxide particles be in a state of making a polysiloxane bond to the particle surface thereof.

A composition (C) containing a pigment can be used to make a layer (C) formed contain the pigment. It is preferred that a dispersion of a pigment be used at the time of preparing a composition (C) containing the pigment. As such a dispersion, a dispersion in which a pigment is dispersed by a breakdown method using a disperser such as a bead mill can also be used other than commercially available dispersions.

In order to suppress yellowing of each of the layer (B) and the layer (C) formed, each of the composition (B) and the composition (C) may contain an antioxidant. As the antioxidant, for example, a hindered phenol-based antioxidant or a hindered amine-based antioxidant is preferred.

Examples of the hindered phenol-based antioxidant include octadecyl 3-(3,5-di-t-butyl-4-hydroxyphenyl)propionate, hexamethylenebis[3(3,5-di-t-butyl-4-hydroxyphenyl propionate, thiodiethylenebis[3(3,5-di-t-butyl-4-hydroxyphenyl propionate, ethylenebis(oxyethylene)bis(3-(5-t-butyl-4-hydroxy-m-tolyl)propionate, tris-(3,5-di-t-butyl-4-hydroxybenzyl) isocyanurate, 1,3,5-trimethyl-2,4,6-tris(3,5-di-t-butyl-4-hydroxybenzyl)benzene, pentaerythritol tetrakis(3-(3,5-di-t-butyl-4-hydroxyphenyl)propionate, 2-t-butyl-6-(3-t-butyl-2-hydroxy-5-methylbenzyl)-4-methylphenyl acrylate, 2-[1-(2-hydroxy 3,5-di-t-pentylphenyl) ethyl]-4,6-di-t-pentylphenyl acrylate, 2,2'-methylenebis(6-t-butyl-4-methylphenol, and 4,4'-butylidenebis(6-t-butyl-3-methylphenol).

Examples of the hindered amine compound include bis (1,2,2,6,6-pentamethyl-4-piperidyl) [[3,5-bis(1,1-dimethylethyl)-4-hydroxyphenyl]methyl]butylmalonate, bis(1,2,2,6, 6-pentamethyl-4-piperidyl) sebacate, methyl-1,2,2,6,6-pentamethyl-4-piperidyl sebacate, 1,2,2,6,6-pentamethyl-4-piperidyl methacrylate, 2,2,6,6-tetramethyl-4-piperidyl methacrylate, reaction products between bis-(2,2,6,6-tetramethyl-1-(octyloxy)-4-piperidinyl) sebacate, 1,1-dimethylethyl hydroperoxide and octane, tetrakis(1,2,2,6,6-pentamethyl-4-pyridyl)butane-1,2,3,4-tetracarboxylate, and tetrakis(2,2,6,6-tetramethyl-4-pyridyl)butane-1,2,3,4-tetracarboxylate.

In the case where each of the composition (B) and the composition (C) is applied with a slit coater or a spin coater, when being measured by means of a cone-plate type (E type) viscometer, the viscosity thereof is preferably 15 cP or less, and more preferably 10 cP or less. The viscosity of each of the composition (B) and the composition (C), which sometimes contains an organic solvent, can be adjusted by appropriately selecting the kind of the organic solvent and the proportion thereof.

Examples of the organic solvent include propylene glycol monomethyl ether, propylene glycol monomethyl ether acetate, diacetone alcohol, tetrahydrofurfuryl alcohol, ethylene glycol mono-n-butyl ether, 2-ethoxyethyl acetate, 1-methoxypropyl-2-acetate, 3-methoxy-3-methylbutanol, 3-methoxy-3-methylbutanol acetate, 3-methoxybutyl acetate, 1,3-butylene glycol diacetate, ethylene glycol monobutyl ether acetate, diethylene glycol monobutyl ether acetate, ethyl lactate, butyl lactate, ethyl acetoacetate, and γ-butyrolactone. In order to dissolve the respective components uniformly, an alcoholic compound, an ester-based compound, or an ether-based compound is preferred, and these compounds having a boiling point of 110 to 250° C. under atmospheric pressure are more preferred.

Furthermore, a layer (D) as a light-shielding layer may be formed on a surface of the layer (C). As the layer (D), a black color layer, which is high invisible light absorbing properties, is preferred. By forming the layer (D) as a light-shielding layer, an OD (optical density) value is improved, and visibility of a metal wire portion of a touch panel can be further suppressed. As a method of forming a layer (D), a photolithography step, in which a photosensitive black resin composition is used, is preferred. Moreover, although an OD value per thickness is lowered, the layer (D) may be a gray color layer since a laminated base material has a merit that an influence on reflection chromaticity can be alleviated by laminating a layer (D) on a layer (C) in a design aspect thereof. It is preferred that at least both of a white pigment and a black pigment be contained in the gray color layer.

Examples of the photosensitive black resin composition include a composition containing a black pigment, an alkali-soluble resin, a polyfunctional monomer, and a photopolymerization initiator. The photosensitive black resin composition may contain an additive as required. Examples of the black pigment include carbon black, titanium nitride, and cobalt oxide. On the other hand, for example, in the case of forming a layer (C) being a black color-based decorating layer by using a photosensitive black resin composition, a layer (D) does not need to be formed.

Moreover, the present invention can also be utilized in a cover glass production process, and one example of the method includes a transfer method. The transfer method referred to herein means a method of transferring only a pattern previously formed on a surface of a support rich in bendability such as a plastic film from the support to a surface of a substrate. By using a transfer method, a decorating layer can be conveniently formed in a good yield not only on a flat surface but also on a surface of a substrate, being known as a 2.5D cover glass or a 3D cover glass, having a curved surface part on which direct printing is hardly performed, and cover glasses with a variety of shapes can be produced.

Hereinafter, a specific example of the production process of a cover glass with a white decorating layer will be described. An example of the production process includes a photolithography step, an adhesive layer formation step, a transfer step, and a curing step in this order.

In the photolithography step, a black photosensitive composition is applied onto a surface of a support and dried to obtain a coating film (D), and onto a surface of the coating film, a white photosensitive composition is applied to obtain a coating film (C). Next, the coating film (D) and the coating film (C) are collectively exposed to light from a coating film (C) side to obtain an exposed laminated film composed of an exposed film (D) prepared by exposing the coating film (D) to light and an exposed film (C) prepared by exposing the coating film (C) to light. Next, the two exposed films constituting the exposed laminated film are collectively developed to obtain a developed laminated film, which is composed of a developed film (D) prepared by subjecting the exposed film (D) to development and a developed film (C) prepared by subjecting the exposed film (C) to development, on the support.

In the adhesive layer formation step, an adhesive material (B) is partially applied only onto a surface of the developed film (C) and exposed to light to form an adhesive layer.

In the transfer step, the adhesive layer is bonded onto a surface of a substrate. (A), and furthermore, the support is peeled off.

In the curing step, the developed laminated film is cured by heating.

By this production process, a cover glass provided with a substrate in which a layer (B), a layer (C), and a layer (D) are laminated in this order on the surface of a substrate (A), namely, a laminated base material of the present invention, can be obtained. Furthermore, a touch panel provided with a laminated base material of the present invention can be obtained.

Examples of the support include a release film. The release film refers to a film constituted of a base film and a release layer, being formed on a surface of the base film, by which the adhesion and the releasability are moderately controlled.

Examples of the base film include a film of polyethylene terephthalate, polycarbonate, or polystyrene, which is excellent in heat resistance and the like. A biaxially oriented polyethylene terephthalate film is preferred. Moreover, examples of the release layer include a release layer composed of a resin such as a melamine-based one, a melamine/acryl-based one, an acryl-based one, an epoxy-based one, or a silicone-based one, which is high in degree of crosslinking and excellent in solvent resistance.

In the point that the conveyance in a roll-to-roll process being high in productivity is facilitated, a thickness of the support is preferably 50 to 150 µm.

As the adhesive material (B), an adhesive material for optics, with which a photocured film with a transparency of a total light transmittance in a visible light region of 90% or more can be prepared, can be used. From the viewpoints of the thickness, refractive index, transmittance, curing volume contraction rate, adhesiveness to a substrate (A), and the like, an adhesive material (B) can be appropriately selected to be supplied. In particular, a UV-curable adhesive material containing at least a component, such as a (meth)acrylate, a silicon-based (meth)acrylate, or a urethane (meth)acrylate, which is made into an acrylic resin after being photocured is preferred. Moreover, because there is a case where, after an adhesive material is partially applied only onto a surface of a developed film (C), a pattern shape of the developed film is deformed, a solventless UV-curable adhesive material not containing a solvent is more preferred.

Examples of the solventless UV-curable adhesive material include FINETACK RX-101, 102, 103, or 104 (all manufactured by DIC Corporation), P-5920J (manufactured by Daido Chemical Corporation), SK-Dyne Syrup WS (manufactured by Soken Chemical & Engineering Co., Ltd.), BEAMSET NTZ-303 or 304 (both manufactured by ARAKAWA CHEMICAL INDUSTRIES, LTD.), and the like, and as required, these adhesive materials may be subsequently added with a refractive index regulating component, a photopolymerization initiator, a leveling agent, and the like to be used.

An adhesive material (B) is partially applied by a known printing method such as screen printing, gravure printing, and gravure offset printing so as to have the same pattern as a pattern of the developed film (C), after which the whole surface of the pattern accompanied by a support is irradiated with UV to be photocured and press-bonded, and furthermore, the pattern in a state of being bonded to a substrate (A) is heated to be formed into an adhesive layer corresponding to a layer (B) as a prescribed pattern only on a decorative area of the substrate (A). Accordingly, by controlling a refractive index difference between a substrate (A) and an adhesive layer so that a refractive index nA of the substrate (A) and a refractive index nB of the layer (B) satisfy the relationship of $0.6 \geq |nA-nB| \geq 0.1$, an effect of enhancing the lightness in the present invention is obtained.

In the case of using a laminated base material of the present invention in a cover glass excluding a cover glass-integrated type touch panel of an OGS (one glass solution) system, a thickness of the layer (B) is preferably 0.1 to 50 µm, and more preferably 3 to 30 µm. When being less than 0.1 µm, there is a case where no enhancement in lightness to be created by the present invention is attained. On the other hand, when being more than 50 µm, loss of reflected light due to light absorption of the layer (B) itself becomes impossible to be ignored, and as a result thereof, there is a case where an effect of enhancing the lightness becomes insufficient. In this connection, the layer (B) may be an OCA (optical clear adhesive sheet) subjected to blanking and cutting so as to have the same shape as that of a decorative area of the substrate (A) to be prepared or an optical double-sided tape having a light transmitting property.

As a transfer apparatus, a roll laminator or a hot press machine, which is generally used in a bonding step for a cover glass and a touch sensor, can be selected to be used, and either of a continuous type one and a sheet-fed type one is acceptable.

EXAMPLES

Hereinafter, the present invention will be described in detail with reference to examples and comparative examples, but the embodiment of the present invention is not limited thereto.

(Synthesis of Silica-Copolymerized Polysiloxane Solution (b-1))

Into a three-necked flask, 217.55 g of isopropyl alcohol dispersion type hollow silica sol (solid content of 10% by mass, average particle diameter of 40 nm), 217.55 g of isopropyl alcohol dispersion type porous silica sol (solid content of 10% by mass, average particle diameter of 25 nm), 204.70 g of diacetone alcohol (hereinafter, referred to as "DAA"), and 2.25 g of methyltrimethoxysilane, 2.40 g of trifluoropropyltrimethoxysilane, 2.16 g of 3-trimethoxysilylpropyl succinic anhydride, and 4.51 g of acryloxypropyltrimethoxysilane (the mol ratio of alkoxysilanes of methyltrimethoxysilane/trifluoropropyltrimethoxysilane/3-trimethoxysilylpropyl succinic anhydride/acryloxypropyltrimethoxysilane=30/20/15/35) were charged, the flask was immersed in an oil bath at 40° C., and an aqueous phosphoric acid solution having 0.023 g (0.2% by mass with respect to the amount of charged alkoxysilanes) of phosphoric acid as an acid catalyst dissolved in 3.12 g of water was added over 10 minutes by use of a dropping funnel while stirring the solution. The resulting mixture was stirred at 40° C. for 1 hour, and then stirred for 1 hour with an oil bath temperature set at 70° C., and furthermore the oil bath temperature was risen to 115° C. over 30 minutes. An internal temperature of the solution reached 100° C. after a lapse of one hour from the start of temperature rising, and then the solution was heated and stirred for 1 hour (internal temperature was 100 to 110° C.). Isopropyl alcohol, methanol being a byproduct, and water were distilled off with use of a Liebig condenser during the reaction.

At the end of 1 hour, the reactant was cooled to 5° C. to terminate the reaction and phosphoric acid was removed with use of an ion exchange resin. To the resulting resin solution, DAA was added so that a concentration of a solid content is 20% by mass to prepare a silica-copolymerized polysiloxane solution (b-1) in which a mass ratio of the moiety derived from silicon dioxide to the moiety derived from alkoxysilanes is 85/15.

(Synthesis of Polysiloxane Solution (c-1))

Into a three-necked flask, 47.7 g of methyltrimethoxysilane, 99.2 g of phenyltrimethoxysilane, and 39.4 g of 3-trimethoxysilylpropyl succinic anhydride (methyltrimethoxysilane/phenyltrimethoxysilane/3-trimethoxysilylpropyl succinic anhydride=30/50/15), and 152.3 g of propylene glycol methyl ether acetate (hereinafter, referred to as "PGMEA") were charged, the flask was immersed in an oil bath at 40° C., and an aqueous phosphoric acid solution having 0.372 g (0.2% by mass with respect to the amount of charged alkoxysilanes) of phosphoric acid dissolved in 56.7 g of water was added over 10 minutes by use of a dropping funnel while stirring the solution. The resulting mixture was stirred at 40° C. for 1 hour, and then stirred for 1 hour with an oil bath temperature set at 70° C., and furthermore the oil bath temperature was risen to 115° C. over 30 minutes. An internal temperature of the solution reached 100° C. after a lapse of one hour from the start of temperature rising, and then the solution was heated and stirred for 2 hours (internal temperature was 100 to 110° C.). Methanol being a byproduct and water were distilled off with use of a Liebig condenser during the reaction. At the end of 2 hours, the reactant was cooled to 5° C. to terminate the reaction and phosphoric acid was removed with use of an ion exchange resin. To the resulting resin solution, PGMEA was added so that a concentration of a solid content is 40% by mass to prepare a polysiloxane solution (C).

(Synthesis of Acrylic Resin Solution (d-1))

Into a three-necked flask, 2 g of 2,2'-azobis(isobutyronitrile) and 50 g of PGMEA were charged, and furthermore, 26.5 g of methacrylic acid, 21.3 g of styrene, and 37.7 g of tricyclo[5.2.1.02,6]decane-8-yl methacrylate were charged, the resulting mixture was stirred at room temperature for some time, and the inside of the flask was adequately replaced with nitrogen by nitrogen bubbling, and then the mixture was heated and stirred at 70° C. for 5 hours. Next, to the resulting solution, 14.6 g of glycidyl methacrylate, 1 g of chromium(III) acetylacetonate, 0.2 g of p-methoxyphenol, and 100 g of PGMEA were added, and the resulting mixture was heated and stirred at 90° C. for 4 hours. To the resulting resin solution, PGMEA was added so that a concentration of a solid content is 40% by mass to prepare an acrylic resin solution (d-1).

(Preparation of Composition (B-1))

To 15.00 g of a silica-copolymerized polysiloxane solution (b-1), 0.03 g of bis(2,4,6-trimethylbenzoyl)-phenylphosphine oxide (IRGACURE 819; manufactured by BASF CORPORATION) was added and DAA was added so that a concentration of a solid content is 10% by mass and the resulting mixture was stirred for 1 hour to prepare a composition (B-1).

(Refractive Index of Layer (B) Formed Using Composition (B-1))

Onto a surface of a 4-inch silicon wafer substrate, the composition (B-1) was applied with a spin coater and pre-baked at 100° C. for 2 minutes with a hot plate (SCW-636 manufactured by Dainippon Screen Mfg. Co., Ltd.), and the whole surface of the pre-baked film was exposed to light from an ultra-high pressure mercury lamp as a light source at an exposure amount of 200 mJ (on the i-ray equivalent basis) using a PLA (PLA-501F manufactured by Canon Inc.). Thereafter, the exposed film was shower-developed with a 0.045% by mass KOH aqueous solution for 120 seconds using an automatic developing apparatus (AD-2000; manufactured by Takizawa Sangyo Co., Ltd.), and then rinsed with water for 30 seconds, after which the film was cured for 60 minutes in the air in an oven previously set so that the actually measured substrate temperature becomes 230° C. The refractive index nB of the resulting layer (B) with a thickness of 1 µm was determined to be 1.20. Moreover, the refractive index nB of a layer (B) obtained in the same manner as above except that 60 minutes for curing were divided into two times of 30 minutes for curing was also determined to be 1.20. Furthermore, layers (B) were made to have thicknesses of 0.1 µm, 1.5 µm, and 3 µm, respectively to investigate the refractive index nB, but there was no difference in the refractive index nB.

(Preparation of Compositions (B-2) to (B-7))

Each of prescribed amounts of composition (B-1) was added with dipentaerythritol hexaacrylate being a refractive index-heightening component so that the addition amount is minutely changed, added with DAA so that a concentration of a solid content is 10% by mass, and stirred for 1 hour to prepare a large number of compositions which had been treated by use of a 0.20-µm filtration filter. In the same manner as for forming a layer (B) with use of the composition (B-1), each of layers (B) were formed with use of the respective compositions, and measured for the refractive index nB. Refractive indexes nB attributed to a composition (B-2), a composition (B-3), a composition (B-5), a composition (B-6), and a composition (B-7) were determined to be at levels of 1.31, 1.41, 1.35, 1.21, and 1.47, respectively. As in the case where the composition (B-1) was used, with regard to compositions (B-2) to (B-7), a refractive index nB of a layer (B) obtained in the case where the curing process is divided into 2 times of 30 minutes to be performed was investigated, but there was no difference in the refractive index nB.

Moreover, with regard to each of the compositions (B-2) to (B-7), layers (B) were made to have thicknesses of 0.1 µm, 1.5 µm, and 3 µm, respectively to investigate the refractive index nB, but there was no difference in the refractive index nB in any one of the compositions.

(Preparation of Composition (B-8))

To 1.364 g of a zirconium oxide dispersion (a PGMEA-based dispersion of dipentaerythritol hexaacrylate/zirconium oxide=3/7 (weight ratio); zirconia content is 35 wt %), 0.0382 g of "IRGACURE" OXE-02, 0.0048 g of HQME, 9.50 g of THEA, and 8.347 g of PGMEA were added and stirred to be dissolved.

Furthermore, to this liquid, 0.0682 g of a PGMEA solution of 50 wt % of dipentaerythritol hexaacrylate, 0.478 g of CR-TR5 (manufactured by Osaka Gas Chemicals Co., Ltd.; a PGMEA solution of 50 wt % of an alkali-soluble cardo resin), and 0.2000 g of a PGMEA solution of 1 wt % of BYK-333 as a leveling agent were added respectively, stirred for 1 hour, and filtered through a 0.20-µm filter to prepare a composition (B-8).

As in the case of the composition (B-1), layers (B) were made to have thicknesses of 0.1 µm, 1.5 µm, and 3 µm, respectively to be measured for the refractive index nB, but all of the refractive indexes nB were determined to be 1.66.

(Preparation of Composition (B-9))

To 8.347 g of PGMEA, 0.0382 g of "IRGACURE" OXE-02, 0.0048 g of HQME, and 9.50 g of THFA were added and stirred to be dissolved.

Furthermore, to this liquid, 0.287 g of EA-0250P (manufactured by Osaka Gas Chemicals Co., Ltd.; a PGMEA solution of 50 wt % of 9,9-bis[4-(2-acryloyloxyethoxy)phenyl]fluorene; concentration of solid content is 50 wt %), 0.669 g of a PGMEA solution of 50 wt % of dipentaerythritol hexaacrylate, 0.995 g of CR-TR5, and 0.2000 g of a PGMEA solution of 1 wt % of BYK-333 were added respectively, stirred for 1 hour and filtered through a 0.20-µm filter to prepare a composition (B-9).

As in the case of the composition (B-1), layers (B) were made to have thicknesses of 0.1 µm, 1.5 µm, and 3 µm, respectively to be measured for the refractive index nB, but all of the refractive indexes nB were determined to be 1.47.

(Preparation of Composition (C-1))

To 102.45 g of a polysiloxane solution (c-1), 75.34 g of titanium dioxide being a white pigment (rutile type, average particle diameter of 0.3 µm, coated with alumina/silica; R960 manufactured by Du Pont Co.) was added, and pre-mixing was performed, after which a dispersing treatment was performed by use of a mill-type disperser loaded with zirconia beads to obtain a white pigment dispersion. Subsequently, to 89.19 g of PGMEA, 30.13 g of a mixture of isocyanuric acid-EO-modified triacrylate and isocyanuric acid-EO-modified diacrylate (M-315 manufactured by TOAGOSEI CO., LTD.) being polyfunctional monomers, 3.77 g of bis(2,4,6-trimethylbenzoyl)-phenylphosphine oxide being a photopolymerization initiator, and 0.45 g of pentaerythritol tetrakis[3-(3,5-di-t-butyl-4-hydroxyphenyl)propionate] (IRGANOX 1010 manufactured by BASF Japan Ltd.) being an antioxidant were added and stirred for 1 hour to be dissolved, after which the solution was mixed with 177.79 g of the above-mentioned white pigment dispersion, and furthermore, stirred for 1 hour to obtain a composition (C-1).

(Preparation of Black Resin Composition (D-1))

Using a mill-type disperser loaded with zirconia beads, 100 g of a titanium nitride pigment (TiN UFP manufactured by NISSHIN ENGINEERING INC.), 47 g of an acrylic resin solution (d-1), 15.5 g of a 40% by mass polymeric dispersant (LPN21116 manufactured by BYK Japan KK) solution, and 337.5 g of PGMEA were charged thereinto and a dispersing treatment was performed to obtain a titanium nitride dispersion with a solid content of 25% by mass. Subsequently, using a mill-type disperser loaded with zirconia beads, 100 g of a carbon black pigment (TPX-1291 manufactured by Cabot Corporation), 47 g of an acrylic resin solution (d-1), 15.5 g of a 40% by mass polymeric dispersant (LPN21116 manufactured by BYK Japan KK) solution, and 337.5 g of PGMEA were charged thereinto and a dispersing treatment was performed to obtain a carbon black dispersion with a solid content of 25% by mass. To 670.50 g of PGMEA, 58.65 g of an acrylic resin solution (d-1), 23.18 g of dipentaerythritol hexaacrylate, and 5.80 g of a photopolymerization initiator (ADEKA OPTOMER N-1919 manufactured by ADEKA CORPORATION) were added and stirred for 1 hour to be dissolved, after which the solution was mixed with 137.10 g of the above-mentioned titanium nitride dispersion and 137.10 g of the above-mentioned carbon black dispersion, and furthermore, stirred for 1 hour to obtain a black resin composition (D-1).

(Preparation of Transparent Resin Composition (E-1))

A transparent resin composition (E-1) was obtained by mixing 50 g of an acrylic resin solution (d-1), 16 g of dipentaerythritol hexaacrylate, 2 g of 1,2-octanedione, 1-[4-(phenylthio)-, 2-(O-benzoyloxime)] ("IRGACURE" OXE-01 manufactured by BASF Japan Ltd.), 31.9 g of diacetone alcohol, and 0.1 g of polyether-modified polydimethylsiloxane (BYK-333 manufactured by BYK Japan KK).

(Preparation of Acryl-Based Resin Solution d-2)

An acryl-based resin A (weight average molecular weight of 43000, acid value of 110 mgKOH/g, glass transition temperature Tg of 110° C.) prepared by subjecting a carboxyl group in an interpolymer composed of 40 mol % of methacrylic acid, 30 mol % of methyl methacrylate, and 30 mol % of styrene as copolymerized components to an addition reaction with 0.4 equivalents of glycidyl methacrylate was dissolved in butyl carbitol acetate so that a solid content is 40% by mass to obtain an acryl-based resin solution d-2.

(Preparation of Composition (C-2))

A composition (C-2) was obtained by mixing 49.02 g of a white pigment (rutile type titanium oxide; average primary particle diameter of 0.3 µm; coated with alumina/silica; R960 manufactured by Du Pont Co.), 122.55 g of an acryl-based resin solution d-2, 19.61 g of a mixture of isocyanuric acid-EO-modified triacrylate and isocyanuric acid-EO-modified diacrylate (M-315 manufactured by TOAGOSEI CO., LTD.), 4.20 g of a urethane acrylate (reactant between pentaerythritol triacrylate and hexamethylenediisocyanate; UA-306H manufactured by Kyoeisha Chemical Co., Ltd.), 2.80 g of a photopolymerization initiator B (IC-379), 0.42 g of pentaerythritol tetrakis[3-(3,5-di-t-butyl-4-hydroxyphenyl)propionate] (IRGANOX 1010 manufactured by BASF Japan Ltd.) being an antioxidant, and 3.13 g of butyl carbitol acetate, and subjecting the mixture to preliminary stirring, and then, to a dispersing/kneading treatment with use of a roll mill.

(Preparation of Black Resin Composition (D-2))

A black resin composition (D-2) was obtained by mixing 31.80 g of a black pigment (carbon black; average primary particle diameter of 24 nm; MA-100 manufactured by Mitsubishi Chemical Corporation), 5.00 g of a polymeric dispersant (LPN-21116 manufactured by BYK Japan KK), 21.20 g of dipentaerythritol hexaacrylate, 5.30 g of a photopolymerization initiator A (N-1919 manufactured by ADEKA CORPORATION), 3.18 g of a photopolymerization initiator B (IC-379), 110.25 g of an acryl-based resin solution d-2, and 24.58 g of butyl carbitol acetate, and subjecting the mixture to preliminary stirring, and then to a dispersing/kneading treatment with use of a roll mill.

Example 1

As a substrate (A-1), a sheet of chemically strengthened glass with a longitudinal length of 10 cm, a transversal length of 10 cm, a thickness of 0.7 mm, and a refractive index of 1.51 was prepared. A composition (B-1) and a composition (C-1) were used to prepare a laminated base material, the pattern shape of a layer (C) was evaluated by a method of (i) and an evaluation for the total reflection chromaticity including lightness was performed by a method of (ii).

Figure 2:
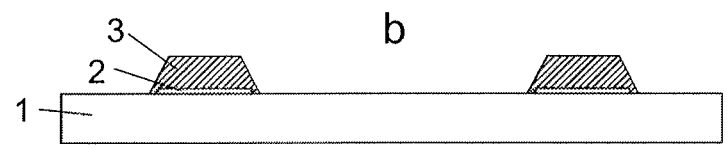
FIG. 2 is a schematic illustration showing a cross-section of a laminated base material of the present invention.

Onto a surface of a substrate (A-1) (symbol 1 in FIG. 2), a composition (B-1) was applied with a spin coater and pre-baked at 100° C. for 2 minutes with a hot plate, and the pre-baked film was exposed to light from an ultra-high pressure mercury lamp as a light source at an exposure amount of 200 mJ (on the i-ray equivalent basis) using a PLA with a mask gap of 150 µm. Thereafter, the exposed film was shower-developed with a 0.045% by mass KOH aqueous solution for 120 seconds using an automatic developing apparatus (AD-2000; manufactured by Takizawa Sangyo Co., Ltd.), and then rinsed with water for 30 seconds, after which the film was cured for 30 minutes in the air in an oven previously set so that the actually measured temperature of the substrate (A-1) becomes 230° C. to form a pattern of the layer (B) with a thickness of 1 µm (symbol 2 in FIG. 2). Subsequently, onto a surface of the layer (B), a composition (C-1) was applied with a spin coater, and a pattern of the layer (C) with a thickness of 16 µm (symbol 3 in FIG. 2) was formed in the same manner as above except for using 2.38% by mass TMAH as a developer and setting the shower-developing time to 60 seconds to produce a laminated base material 1. In this connection, the thickness of a layer (C) was determined by subtracting only a thickness of a layer (B) from a thickness of two layers of the layer (C) and the layer (B). Moreover, according to the following methods (i) and (ii), the layer (C) and the laminated base material 1 were evaluated for the pattern shape and the reflection chromaticity, respectively. Evaluation results are shown in Table 1.

(i) Evaluation for Pattern Shape of Layer (C)

From a pattern of the layer (C) formed, a portion of a line width of 3000 µm was cut out, a cross-section of an edge part of the pattern was observed with use of a scanning electron microscope (SEM) to evaluate a pattern shape on the basis of the following criteria for judgment, and the pattern shapes in A, B and C were defined as being acceptable.

A: Taper angle is less than 70°.
B: Taper angle is 70° or more and less than 80°.
C: Taper angle is 80° or more and less than 90°.
D: 90° or more or undercut shape (ii) Evaluation for Reflection Chromaticity of Laminated Base Material Using a spectral colorimeter (CM-2600d manufactured by KONICA MINOLTA, INC.) calibrated with a white calibration plate (CM-A145 manufactured by KONICA MINOLTA, INC.), under measurement conditions of standard light source D65 (color temperature 6504 K), viewing angle 2° (CIE 1976), atmospheric pressure, and 20° C., the total reflection chromaticity (SCI) to light made incident from an opposite face of a substrate (A) was measured to evaluate the reflection chromaticity (L*, a*, b*).

In this connection, the spectral colorimeter was inverted so as to be in a state of emitting light upward, and an opposite face of a substrate (A) of the laminated base material was pressed against a light emitting part of the spectral colorimeter to perform the measurement.

Example 2

A laminated base material 2 was obtained in the same manner as in Example 1 except for using the composition (B-2) for formation of a layer (B), and an evaluation thereof was performed. Evaluation results are shown in Table 1.

Example 3

A laminated base material 3 was obtained in the same manner as in Example 1 except for using a substrate (A-2) (a sapphire substrate with a longitudinal length of 10 cm, a transversal length of 10 cm, a thickness of 0.7 mm, and a refractive index nA of 1.77) in place of the substrate (A-1), and an evaluation thereof was performed. Evaluation results are shown in Table 1.

Example 4

A laminated base material 4 was obtained in the same manner as in Example 1 except for using the composition (B-3) for formation of a layer (B), and an evaluation thereof was performed. Evaluation results are shown in Table 1.

Example 5

A laminated base material 5 was obtained in the same manner as in Example 1 except for using the composition (B-4) for formation of a layer (B), and an evaluation thereof was performed. Evaluation results are shown in Table 1.

Example 6

A laminated base material 6 was obtained in the same manner as in Example 1 except for using the composition (B-5) for formation of a layer (B), and an evaluation thereof was performed. Evaluation results are shown in Table 1.

Example 7

A laminated base material 7 was obtained in the same manner as in Example 1 except for using the composition (B-6) for formation of a layer (B), and an evaluation thereof was performed. Evaluation results are shown in Table 1.

Example 8

A laminated base material 8 was obtained in the same manner as in Example 1 except for using the composition (B-2) for formation of a layer (B), setting the thickness of the layer (B) to 0.2 µm, and setting the thickness of the layer (C) to 15 µm, and an evaluation thereof was performed. Evaluation results are shown in Table 1.

Example 9

A laminated base material 9 was obtained in the same manner as in Example 1 except for using the composition (B-2) for formation of a layer (B), setting the thickness of the layer (B) to 0.2 µm, and setting the thickness of the layer (C) to 18 µm, and an evaluation thereof was performed. Evaluation results are shown in Table 1.

Example 10

A laminated base material 10 was obtained in the same manner as in Example 1 except for using the composition (B-2) for formation of a layer (B), setting the thickness of the layer (B) to 1.5 µm, and setting the thickness of the layer (C) to 15 µm, and an evaluation thereof was performed. Evaluation results are shown in Table 1.

Example 11

A laminated base material 11 was obtained in the same manner as in Example 1 except for using the composition (B-2) for formation of a layer (B), setting the thickness of the layer (B) to 1.5 µm, and setting the thickness of the layer (C) to 18 µm, and an evaluation thereof was performed. Evaluation results are shown in Table 1.

Example 12

A laminated base material 12 was obtained in the same manner as in Example 1 except for using the composition (B-2) for formation of a layer (B), setting the thickness of the layer (B) to 0.1 µm, and setting the thickness of the layer (C) to 10 µm, and an evaluation thereof was performed. Evaluation results are shown in Table 1.

Example 13

A laminated base material 13 was obtained in the same manner as in Example 1 except for using the composition (B-2) for formation of a layer (B), setting the thickness of the layer (B) to 0.1 µm, and setting the thickness of the layer (C) to 20 µm, and an evaluation thereof was performed. Evaluation results are shown in Table 1.

Example 14

A laminated base material 14 was obtained in the same manner as in Example 1 except for using the composition (B-2) for formation of a layer (B), setting the thickness of the layer (B) to 3 µm, and setting the thickness of the layer (C) to 10 µm, and an evaluation thereof was performed. Evaluation results are shown in Table 1.

Example 15

A laminated base material 15 was obtained in the same manner as in Example 1 except for using the composition (B-2) for formation of a layer (B), setting the thickness of the layer (B) to 3 µm, and setting the thickness of the layer (C) to 20 µm, and an evaluation thereof was performed. Evaluation results are shown in Table 1.

Example 16

A laminated base material 16 was obtained in the same manner as in Example 1 except for using the composition (B-2) for formation of a layer (B), setting the thickness of the layer (B) to 1 µm, and setting the thickness of the layer (C) to 30 µm, and an evaluation thereof was performed. Evaluation results are shown in Table 1.

Example 17

A laminated base material 17 was obtained in the same manner as in Example 1 except for using the composition (B-2) for formation of a layer (B), setting the thickness of the layer (B) to 1 µm, using the negative-type photosensitive black resin composition (D-1) for formation of a layer (C), using 0.045% by mass KOH as a developer, and setting the thickness of the layer (C) to 1 µm, and an evaluation thereof was performed. Evaluation results are shown in Table 1.

Example 18

A laminated base material 18 was obtained in the same manner as in Example 1 except for using the composition (B-8) for formation of a layer (B) and using 0.4% by mass TMAH as a developer, and an evaluation thereof was performed. Evaluation results are shown in Table 1.

Example 19

A laminated base material 19 was obtained in the same manner as in Example 1 except for using the composition (B-2) for formation of a layer (B), setting the thickness of the layer (B) to 1 µm, and setting the thickness of the layer (C) to 40 µm, and an evaluation thereof was performed. Evaluation results are shown in Table 1.

Comparative Example 1

A laminated base material 20 was obtained in the same manner as in Example 1 except for forming only a layer (C) on the surface of the substrate (A-1) without forming a layer (B), and an evaluation thereof was performed. Evaluation results are shown in Table 1.

Comparative Example 2

A laminated base material 21 was obtained in the same manner as in Example 1 except for forming only a layer (C) on the surface of the substrate (A-1) without forming a layer (B) and setting the thickness of the layer (C) to 30 and an evaluation thereof was performed. Evaluation results are shown in Table 1.

Comparative Example 3

A laminated base material 22 was obtained in the same manner as in Example 1 except for using the composition (B-7) for formation of a layer (B), and an evaluation thereof was performed. Evaluation results are shown in Table 1.

Comparative Example 4

A laminated base material 23 was obtained in the same manner as in Example 1 except for setting the thickness of the layer (C) to 41 μm without forming a layer (B), and an evaluation thereof was performed. Evaluation results are shown in Table 1.

Comparative Example 5

A laminated base material 24 was obtained in the same manner as in Example 1 except for using the negative-type photosensitive black resin composition (D-1) and 0.045% by mass KOH as a developer to form a layer (C) on the surface of the substrate (A-1) without forming a layer (B) and setting the thickness thereof to 1 μm, and an evaluation thereof was performed. Evaluation results are shown in Table 1.

Comparative Example 6

A laminated base material 25 was obtained in the same manner as in Example 3 except for using the composition (B-9) for formation of a layer (B) and using 0.4% by mass TMAH as a developer, and an evaluation thereof was performed. Evaluation results are shown in Table 1.

Comparative Example 7

A laminated base material 26 was obtained in the same manner as in Example 1 except for reversing the order of formation of the layer (B) and the layer (C), and an evaluation thereof was performed. Evaluation results are shown in Table 1.

Example 20

A pattern of the layer (D) with a thickness of 2 μm (symbol 4 in FIG. 4) being a black light-shielding layer was formed in the same manner as for the formation of the layer (C) except for applying a black resin composition (D-1) onto a surface of the layer (C) of the laminated base material 1 with a spin coater, using a mask with a pattern smaller in line width by 400 μm than the pattern of the layer (C), and using 0.045% by mass KOH as a developer, and a laminated base material 1' was obtained.

On the laminated base material 1', ITO having a thickness of 150 nm was deposited by performing sputtering at an RF power of 1.4 kW and at a vacuum degree of $6.65 \times 10^{-1}$ Pa for 12.5 minutes using a sputtering system (HSR-521A manufactured by Shimadzu Corporation), and furthermore, onto a surface thereof, a positive type photoresist (OFPR-800 manufactured by Tokyo Ohka Kogyo Co., Ltd.) was applied and pre-baked at 80° C. for 20 minutes to obtain a resist film having a thickness of 1.1 μm. After the obtained resist film was pattern-exposed to light from an ultra-high pressure mercury lamp as a light source through a mask using a PLA, the exposed film was shower-developed with a 2.38% by mass TMAH aqueous solution for 90 seconds using an automatic developing apparatus, and then rinsed with water for 30 seconds. Thereafter, ITO was etched by immersion into a 3.5% by mass aqueous solution of oxalic acid for 150 seconds, and the photoresist was removed by treatment with a stripping solution (4% by mass potassium hydroxide aqueous solution) at 50° C. for 120 seconds, and annealing was applied at 230° C. for 30 minutes to form a pattern of ITO with a thickness of 150 nm (symbol 5 in FIGS. 3 and 4).

Figure 3:
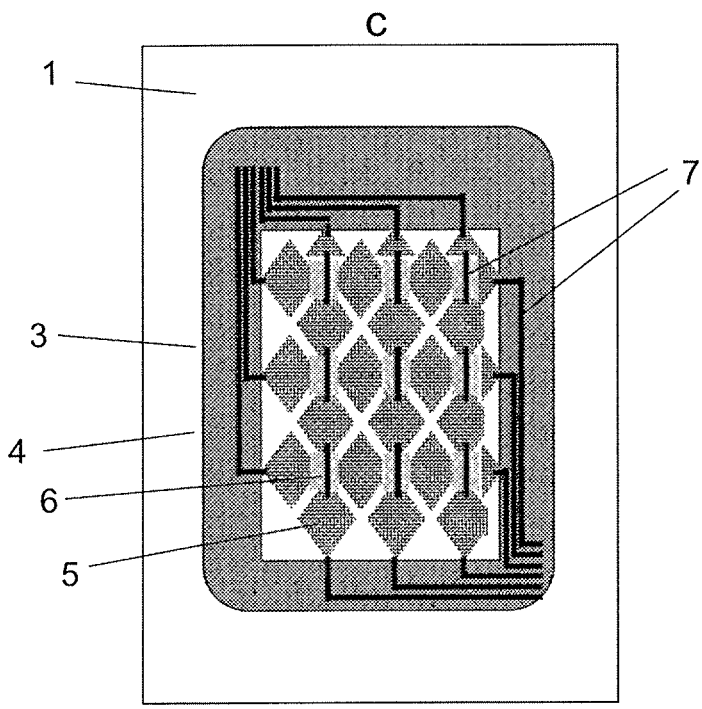
FIG. 3 is a schematic illustration showing the constitution of a touch panel provided with a laminated base material of the present invention.
Figure 4:
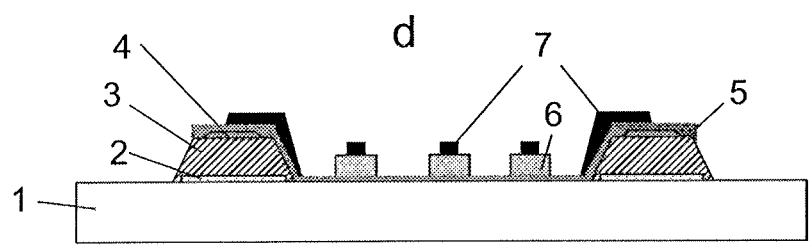
FIG. 4 is a schematic illustration showing a cross-section of a touch panel provided with a laminated base material of the present invention.

Onto a surface of the laminated base material, on which the pattern of ITO was formed, a pattern of a transparent insulating film was formed in the same manner as for the formation of the layer (D) except for applying a transparent resin composition (E-1) with a spin coater and changing the mask into another mask (symbol 6 in FIGS. 3 and 4).

On a surface of the laminated base material, on which the transparent insulating film was formed, MAM (Mo: molybdenum/Al: aluminum/Mo: molybdenum) wires with a thickness of 250 nm were formed (symbol 7 in FIGS. 3 and 4) in the same manner as for the formation of the layer (D) except for using molybdenum and aluminum as a target and a mixed solution of $H_3PO_4/HNO_3/CH_3COOH/H_2O$ (in a mass ratio of 65/3/5/27) as an etchant to produce a cover glass-integrated type touch panel 1 being an OGS (one glass solution) type one in which a touch panel layer is directly formed on a cover glass.

A decorative area of the obtained cover glass-integrated type touch panel 1 was evaluated for the reflection chromaticity according to the foregoing method (ii). Moreover, the continuity test of the cover glass-integrated type touch panel 1 was performed, and the case where a current is conducted was judged to be "Good" and the case where a current is not conducted due to disconnection of an electrode wire was judged to be "Poor". Evaluation results are shown in Table 2.

Example 21

A cover glass-integrated type touch panel 2 was obtained in the same manner as in Example 20 except for using a laminated base material obtained in the same manner as in Example 2, and an evaluation thereof was performed. Evaluation results are shown in Table 2.

Example 22

A cover glass-integrated type touch panel 3 was obtained in the same manner as in Example 20 except for using a laminated base material obtained in the same manner as in Example 3, and an evaluation thereof was performed. Evaluation results are shown in Table 2.

Example 23

A cover glass-integrated type touch panel 4 was obtained in the same manner as in Example 20 except for using a laminated base material obtained in the same manner as in Example 4, and an evaluation thereof was performed. Evaluation results are shown in Table 2.

Example 24

A cover glass-integrated type touch panel 5 was obtained in the same manner as in Example 20 except for using a laminated base material obtained in the same manner as in Example 5, and an evaluation thereof was performed. Evaluation results are shown in Table 2.

Example 25

A cover glass-integrated type touch panel 6 was obtained in the same manner as in Example 20 except for using a laminated base material obtained in the same manner as in Example 6, and an evaluation thereof was performed. Evaluation results are shown in Table 2.

Example 26

A cover glass-integrated type touch panel 7 was obtained in the same manner as in Example 20 except for using a laminated base material obtained in the same manner as in Example 7, and an evaluation thereof was performed. Evaluation results are shown in Table 2.

Example 27

A cover glass-integrated type touch panel 8 was obtained in the same manner as in Example 20 except for using a laminated base material obtained in the same manner as in Example 8, and an evaluation thereof was performed. Evaluation results are shown in Table 2.

Example 28

A cover glass-integrated type touch panel 9 was obtained in the same manner as in Example 20 except for using a laminated base material obtained in the same manner as in Example 9, and an evaluation thereof was performed. Evaluation results are shown in Table 2.

Example 29

A cover glass-integrated type touch panel 10 was obtained in the same manner as in Example 20 except for using a laminated base material obtained in the same manner as in Example 10, and an evaluation thereof was performed. Evaluation results are shown in Table 2.

Example 30

A cover glass-integrated type touch panel 11 was obtained in the same manner as in Example 20 except for using a laminated base material obtained in the same manner as in Example 11, and an evaluation thereof was performed. Evaluation results are shown in Table 2.

Example 31

A cover glass-integrated type touch panel 12 was obtained in the same manner as in Example 20 except for using a laminated base material obtained in the same manner as in Example 12, and an evaluation thereof was performed. Evaluation results are shown in Table 2.

Example 32

A cover glass-integrated type touch panel 13 was obtained in the same manner as in Example 20 except for using a laminated base material obtained in the same manner as in Example 13, and an evaluation thereof was performed. Evaluation results are shown in Table 2.

Example 33

A cover glass-integrated type touch panel 14 was obtained in the same manner as in Example 20 except for using a laminated base material obtained in the same manner as in Example 14, and an evaluation thereof was performed. Evaluation results are shown in Table 2.

Example 34

A cover glass-integrated type touch panel 15 was obtained in the same manner as in Example 20 except for using a laminated base material obtained in the same manner as in Example 15, and an evaluation thereof was performed. Evaluation results are shown in Table 2.

Example 35

A cover glass-integrated type touch panel 16 was obtained in the same manner as in Example 20 except for using a laminated base material obtained in the same manner as in Example 16, and an evaluation thereof was performed. Evaluation results are shown in Table 2.

Example 36

A cover glass-integrated type touch panel 17 was obtained in the same manner as in Example 20 except for using a laminated base material obtained in the same manner as in Example 17 and forming no layer (D), and an evaluation thereof was performed. Evaluation results are shown in Table 2.

Example 37

A cover glass-integrated type touch panel 18 was obtained in the same manner as in Example 20 except for using a laminated base material obtained in the same manner as in Example 18, and an evaluation thereof was performed. Evaluation results are shown in Table 2.

Example 38

A cover glass-integrated type touch panel 19 was obtained in the same manner as in Example 20 except for using a laminated base material obtained in the same manner as in Example 19, and an evaluation thereof was performed. Evaluation results are shown in Table 2.

Comparative Example 8

A cover glass-integrated type touch panel 20 was obtained in the same manner as in Example 20 except for using a laminated base material obtained in the same manner as in Comparative Example 1, and an evaluation thereof was performed. Evaluation results are shown in Table 2.

Comparative Example 9

A cover glass-integrated type touch panel 21 was obtained in the same manner as in Example 20 except for using a laminated base material obtained in the same manner as in Comparative Example 2, and an evaluation thereof was performed. Evaluation results are shown in Table 2.

Comparative Example 10

A cover glass-integrated type touch panel 22 was obtained in the same manner as in Example 20 except for using a laminated base material obtained in the same manner as in Comparative Example 3, and an evaluation thereof was performed. Evaluation results are shown in Table 2.

Comparative Example 11

A cover glass-integrated type touch panel 23 was obtained in the same manner as in Example 20 except for using a laminated base material obtained in the same manner as in Comparative Example 4, and an evaluation thereof was performed. Evaluation results are shown in Table 2.

Comparative Example 12

A cover glass-integrated type touch panel 24 was obtained in the same manner as in Example 20 except for using a laminated base material obtained in the same manner as in Comparative Example 5 and forming no layer (D), and an evaluation thereof was performed. Evaluation results are shown in Table 2.

Comparative Example 13

A cover glass-integrated type touch panel 25 was obtained in the same manner as in Example 20 except for using a laminated base material obtained in the same manner as in Comparative Example 6, and an evaluation thereof was performed. Evaluation results are shown in Table 2.

Comparative Example 14

A cover glass-integrated type touch panel 26 was obtained in the same manner as in Example 20 except for using a laminated base material obtained in the same manner as in Comparative Example 7, and an evaluation thereof was performed. Evaluation results are shown in Table 2.

Example 39

A sheet of chemically strengthened glass with a refractive index of 1.51 used in Example 1 was prepared, a composition (D-2), a composition (C-2), and an adhesive material (B-1) having a refractive index nB after curing of 1.41 were used to prepare a cover glass 1, and an evaluation for the total reflection chromaticity including lightness was performed by a method of (ii). In this context, the refractive index nB of a cured film (50 μm in thickness) obtained by previously exposing the whole surface of a film composed of the adhesive material (B-1) as a simple substance to light at an exposure amount of 1000 mJ/cm$^2$ and then heating the film at 180° C. for 20 minutes in an oven was measured to be determined.

Onto a face of a support (biaxially oriented polyethylene terephthalate film with a melamine-based release layer; Cerapeel; 75 μm in thickness, 50 cm in width, and 100 m in winding length; manufactured by Toray Industries, Inc.) on which a release layer is formed, a black resin composition (D-2) was partially applied with use of a screen printer and a sheet of stainless steel-made screen mesh, and subjected to drying by heating at 100° C. for 15 minutes in an oven to obtain a black coating film.

A work process in which a composition (C-2) is applied onto the black coating film and subjected to drying by heating at 100° C. for 15 minutes was repeated two times to obtain a laminated coating film.

The laminated coating film was exposed to light from a high pressure mercury ultraviolet lamp as a light source at an exposure amount of 200 mJ/cm$^2$ (value on the i-ray equivalent basis) through a mask with a mask gap of 150 μm using a PLA to obtain an exposed laminated film.

The exposed laminated film was shower-developed with a 0.045% by mass KOH aqueous solution for 90 seconds using an automatic developing apparatus, and then shower-rinsed with water for 30 seconds, and furthermore, air is blown onto the film to obtain a pattern-shaped developed laminated film. The obtained developed laminated film was subjected to drying by heating at 60° C. for 10 minutes with use of an oven. Then, only onto a surface of the developed laminated film, an adhesive material (B-1) was partially applied by screen printing, and the whole surface of the coating film was exposed to light at an exposure amount of 1000 mJ/cm$^2$ using a PLA to form an adhesive layer.

An end part of the support was fixed so that a face of the adhesive layer overlaps on a chemically strengthened glass substrate and applied with a pressure using a roll laminator (under atmospheric pressure, roll temperature 40° C., roll pressure 0.2 MPa, lamination speed 100 mm/second), an exposed film of the adhesive material (B-1) was made to bond to the sheet of chemically strengthened glass, and the support was peeled off. Then, the film was heated at 180° C. for 20 minutes with use of an oven to obtain a cover glass 1.

The cover glass was cleaved in a direction perpendicular to the surface thereof, the cross-section was observed with a scanning electron microscope (SEM) to measure microscopic lengths, whereupon the thickness of an adhesive layer corresponding to a layer (B) obtained from the adhesive material (B-1), the thickness of a layer (C) obtained from the composition (C-2), and the thickness of a layer (D) obtained from the composition (D-2) were determined to be 50 μm, 23 μm, and 2 μm, respectively.

Example 40

A cover glass 2 was obtained in the same manner as in Example 39 except for using an adhesive material (B-2) having a refractive index nB after curing of 1.31, and an evaluation thereof was performed. Evaluation results are shown in Table 3.

Example 41

A cover glass 3 was obtained in the same manner as in Example 39 except for setting the thickness of an adhesive layer to 51 μm, and an evaluation thereof was performed. Evaluation results are shown in Table 3.

Example 42

A cover glass 4 was obtained in the same manner as in Example 39 except for adopting a spin coater as a coating applicator and setting the thickness of an adhesive layer to 0.1 μm, and an evaluation thereof was performed. Evaluation results are shown in Table 3.

Comparative Example 15

A cover glass 5 was obtained in the same manner as in Example 39 except for using an adhesive material (B-3) having a refractive index nB after curing of 1.51, and an evaluation thereof was performed. Evaluation results are shown in Table 3.

Comparative Example 16

A cover glass 6 was obtained in the same manner as in Example 39 except for using an adhesive material (B-4) having a refractive index nB after curing of 1.47, and an evaluation thereof was performed. Evaluation results are shown in Table 3.

TABLE 1

| | Substrate (A) | Composition (B) | Thickness of Layer (B) (μm) | Composition (C) | Thickness of Layer (C) (μm) | Layer (C) Pattern Shape | Refractive Index nA | Refractive Index nB | \|nA-nB\| | Total Reflection Chromaticity of Laminated Substrate L* (Lightness) | a* | b* | Difference in Lightness Ratio | Basis |
|---|---|---|---|---|---|---|---|---|---|---|---|---|---|---|
| Example 1 | A-1 | B-1 | 1 | C-1 | 16 | A | 1.51 | 1.20 | 0.3 | 87.89 | -1.01 | -0.16 | 1.69 | Comparative Example 1 |
| Example 2 | A-1 | B-2 | 1 | C-1 | 16 | A | 1.51 | 1.31 | 0.2 | 87.68 | -1.01 | -0.12 | 1.48 | Comparative Example 1 |
| Example 3 | A-2 | B-1 | 1 | C-1 | 16 | A | 1.77 | 1.20 | 0.6 | 88.11 | -0.09 | -0.23 | 1.91 | Comparative Example 1 |
| Example 4 | A-1 | B-3 | 1 | C-1 | 16 | A | 1.51 | 1.41 | 0.1 | 86.52 | -1.09 | 0.09 | 0.32 | Comparative Example 1 |
| Example 5 | A-1 | B-4 | 1 | C-1 | 16 | A | 1.51 | 1.40 | 0.1 | 86.54 | -0.98 | 0.09 | 0.34 | Comparative Example 1 |
| Example 6 | A-1 | B-5 | 1 | C-1 | 16 | A | 1.51 | 1.35 | 0.2 | 87.40 | -1.05 | -0.05 | 1.20 | Comparative Example 1 |
| Example 7 | A-1 | B-6 | 1 | C-1 | 16 | A | 1.51 | 1.21 | 0.3 | 87.86 | -1.03 | -0.16 | 1.66 | Comparative Example 1 |
| Example 8 | A-1 | B-2 | 0.2 | C-1 | 15 | A | 1.51 | 1.31 | 0.2 | 87.58 | -0.99 | -0.20 | 1.38 | Comparative Example 1 |
| Example 9 | A-1 | B-2 | 0.2 | C-1 | 18 | A | 1.51 | 1.31 | 0.2 | 87.60 | -0.98 | 0.03 | 1.40 | Comparative Example 1 |
| Example 10 | A-1 | B-2 | 1.5 | C-1 | 15 | A | 1.51 | 1.31 | 0.2 | 87.59 | -1.01 | -0.05 | 1.39 | Comparative Example 1 |
| Example 11 | A-1 | B-2 | 1.5 | C-1 | 18 | A | 1.51 | 1.31 | 0.2 | 87.65 | -0.98 | 0.11 | 1.45 | Comparative Example 1 |
| Example 12 | A-1 | B-2 | 0.1 | C-1 | 10 | A | 1.51 | 1.31 | 0.2 | 86.39 | -0.98 | -1.85 | | |
| Example 13 | A-1 | B-2 | 0.1 | C-1 | 20 | B | 1.51 | 1.31 | 0.2 | 88.01 | -1.00 | 0.18 | 1.81 | Comparative Example 1 |
| Example 14 | A-1 | B-2 | 3 | C-1 | 10 | A | 1.51 | 1.31 | 0.2 | 86.42 | -1.02 | 0.02 | | |
| Example 15 | A-1 | B-2 | 3 | C-1 | 20 | B | 1.51 | 1.31 | 0.2 | 88.12 | -1.05 | 0.42 | 1.92 | Comparative Example 1 |
| Example 16 | A-1 | B-2 | 1 | C-1 | 30 | C | 1.51 | 1.31 | 0.2 | 89.70 | -1.10 | 1.22 | 1.13 | Comparative Example 2 |
| Example 17 | A-1 | B-2 | 1 | D-1 | 1 | A | 1.51 | 1.31 | 0.2 | 30.89 | 0.22 | 0.42 | 1.89 | Comparative Example 5 |
| Example 18 | A-1 | B-8 | 1 | C-1 | 16 | A | 1.51 | 1.66 | 0.2 | 87.10 | -1.04 | 1.20 | 0.90 | Comparative Example 1 |
| Example 19 | A-1 | B-2 | 1 | C-1 | 40 | C | 1.51 | 1.31 | 0.2 | 89.85 | -1.14 | 1.50 | 1.25 | Comparative Example 4 |
| Comparative Example 1 | A-1 | Not used | 0 | C-1 | 16 | A | 1.51 | — | — | 86.20 | -0.94 | -0.28 | | |
| Comparative Example 2 | A-1 | Not used | 0 | C-1 | 30 | C | 1.51 | — | — | 88.57 | -1.06 | 1.11 | | |
| Comparative Example 3 | A-1 | B-7 | 1 | C-1 | 16 | A | 1.51 | 1.47 | 0.0 | 86.20 | -0.93 | 0.07 | 0.00 | Comparative Example 1 |
| Comparative Example 4 | A-1 | Not used | 0 | C-1 | 41 | D | 1.51 | — | — | 88.60 | -1.08 | 1.45 | | |
| Comparative Example 5 | A-1 | Not used | 0 | D-1 | 1 | A | 1.51 | — | — | 29.00 | 0.22 | 0.33 | | |
| Comparative Example 6 | A-1 | B-9 | 1 | C-1 | 16 | A | 1.51 | 1.47 | 0.0 | 86.19 | -1.02 | 0.05 | -0.01 | Comparative Example 1 |
| Comparative Example 7 | A-1 | C-1 | 16 | B-1 | 1 | A | 1.51 | — | — | 86.20 | -0.94 | -0.28 | 0.00 | Comparative Example 1 |

TABLE 2

| | Thickness of Layer (B) (μm) | Thickness of Layer (C) (μm) | Refractive Index nA | Refractive Index nB | \|nA-nB\| | Reflection Chromaticity L* (Lightness) | a* | b* | Continuity Test |
|---|---|---|---|---|---|---|---|---|---|
| Example 20 | 1 | 16 | 1.51 | 1.20 | 0.3 | 87.78 | -1.41 | 0.03 | Good |
| Example 21 | 1 | 16 | 1.51 | 1.31 | 0.2 | 87.28 | -1.42 | 0.05 | Good |
| Example 22 | 1 | 16 | 1.77 | 1.20 | 0.6 | 87.76 | -0.35 | -0.31 | Good |
| Example 23 | 1 | 16 | 1.51 | 1.41 | 0.1 | 86.02 | -1.45 | 0.15 | Good |
| Example 24 | 1 | 16 | 1.51 | 1.40 | 0.1 | 86.10 | -1.43 | 0.14 | Good |
| Example 25 | 1 | 16 | 1.51 | 1.35 | 0.2 | 87.10 | -1.39 | -0.01 | Good |
| Example 26 | 1 | 16 | 1.51 | 1.21 | 0.3 | 87.55 | -1.40 | -0.11 | Good |
| Example 27 | 0.2 | 15 | 1.51 | 1.31 | 0.2 | 87.25 | -1.42 | 0.02 | Good |
| Example 28 | 0.2 | 18 | 1.51 | 1.31 | 0.2 | 87.48 | -1.43 | 0.09 | Good |

TABLE 2-continued

|  | Thickness of Layer (B) (μm) | Thickness of Layer (C) (μm) | Refractive Index | | | Reflection Chromaticity | | | Continuity Test |
|---|---|---|---|---|---|---|---|---|---|
|  |  |  | nA | nB | \|nA-nB\| | L* (Lightness) | a* | b* |  |
| Example 29 | 1.5 | 15 | 1.51 | 1.31 | 0.2 | 87.32 | -1.41 | 0.15 | Good |
| Example 30 | 1.5 | 18 | 1.51 | 1.31 | 0.2 | 87.49 | -1.43 | 0.18 | Good |
| Example 31 | 0.1 | 10 | 1.51 | 1.31 | 0.2 | 85.77 | -1.38 | -1.60 | Good |
| Example 32 | 0.1 | 20 | 1.51 | 1.31 | 0.2 | 87.86 | -1.35 | 0.41 | Good |
| Example 33 | 3 | 10 | 1.51 | 1.31 | 0.2 | 85.78 | -1.38 | 0.11 | Good |
| Example 34 | 3 | 20 | 1.51 | 1.31 | 0.2 | 87.89 | -1.29 | 0.65 | Good |
| Example 35 | 1 | 30 | 1.51 | 1.31 | 0.2 | 89.51 | -1.20 | 1.29 | Good |
| Example 36 | 1 | 1 | 1.51 | 1.31 | 0.2 | 30.88 | 0.22 | 0.44 | Good |
| Example 37 | 1 | 16 | 1.51 | 1.66 | 0.2 | 85.94 | -1.50 | 1.21 | Good |
| Example 38 | 1 | 40 | 1.51 | 1.31 | 0.2 | 89.70 | -1.30 | 1.63 | Good |
| Comparative Example 8 | 0 | 16 | 1.51 | — | — | 83.50 | -1.49 | -0.18 | Good |
| Comparative Example 9 | 0 | 30 | 1.51 | — | — | 88.54 | -1.06 | 1.13 | Good |
| Comparative Example 10 | 1 | 16 | 1.51 | 1.47 | 0.0 | 85.50 | -1.47 | 0.16 | Good |
| Comparative Example 11 | 0 | 41 | 1.51 | — | — | 83.56 | -1.35 | 1.74 | Poor |
| Comparative Example 12 | 0 | 1 | 1.51 | — | — | 23.91 | 0.22 | 0.36 | Good |
| Comparative Example 13 | 1 | 16 | 1.51 | 1.47 | 0.0 | 85.45 | -1.30 | 1.14 | Good |
| Comparative Example 14 | 16 | 1 | 1.51 | — | — | 85.50 | -1.49 | -0.18 | Good |

TABLE 3

|  | Substrate (A) | Adhesive Material (B) | Thickness of Layer (B) (μm) | Composition (C) | Thickness of Layer (C) (μm) | Refractive Index | | | Total Reflection Chromaticity of Laminated Substrate | | | Difference in Lightness Comparison with Comparative Example 15 |
|---|---|---|---|---|---|---|---|---|---|---|---|---|
|  |  |  |  |  |  | nA | nB | \|nA-nB\| | L* (Lightness) | a* | b* |  |
| Example 39 | A-1 | B-1 | 50 | C-2 | 23 | 1.51 | 1.41 | 0.1 | 87.53 | -1.33 | 0.03 | 1.08 |
| Example 40 | A-1 | B-2 | 50 | C-2 | 23 | 1.51 | 1.31 | 0.2 | 87.83 | -1.35 | 0.04 | 1.38 |
| Example 41 | A-1 | B-2 | 51 | C-2 | 23 | 1.51 | 1.41 | 0.1 | 87.23 | -1.32 | 0.10 | 0.78 |
| Example 42 | A-1 | B-1 | 0.1 | C-2 | 23 | 1.51 | 1.41 | 0.1 | 87.90 | -1.28 | 0.01 | 1.45 |
| Comparative Example 15 | A-1 | B-3 | 50 | C-2 | 23 | 1.51 | 1.51 | 0.0 | 86.45 | -1.30 | 0.04 |  |
| Comparative Example 16 | A-1 | B-4 | 50 | C-2 | 23 | 1.51 | 1.47 | 0.0 | 86.45 | -1.30 | 0.04 | 0.00 |

Figure 5:
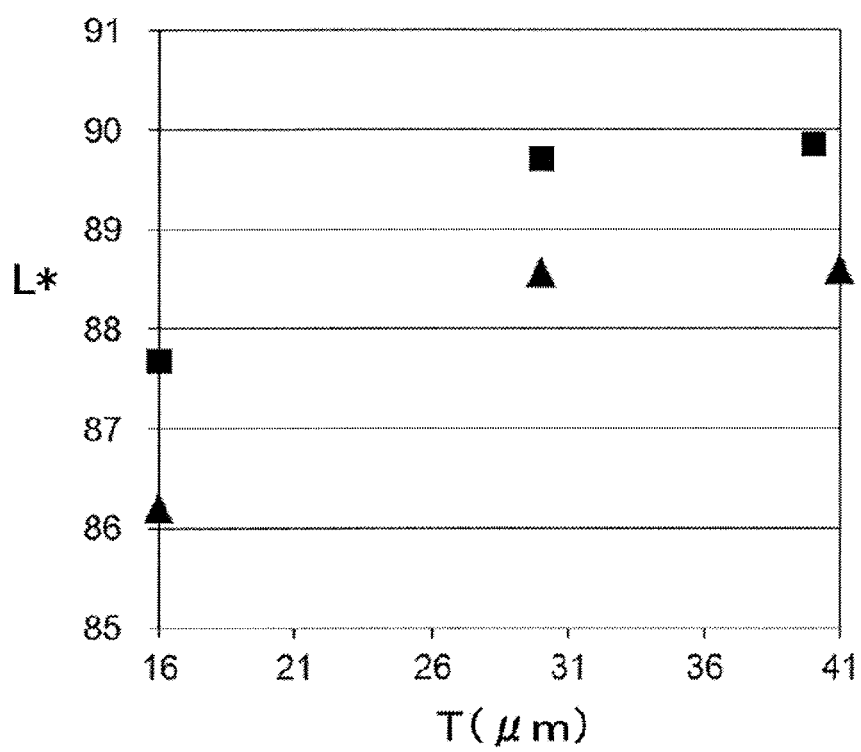
FIG. 5 is an illustration showing the relationship between the thickness of a layer (C) and the lightness in a laminated base material of the present invention.

The relationship between the thickness T (μm) of the layer (C) and the lightness L* in a laminated base material of the present invention is shown in FIG. 5. The thickness T (μm) of the layer (C) is taken as abscissa, and the lightness L* is taken as ordinate. Examples 2, 16 and 19 are shown by points of filled square and Comparative Examples 1, 2 and 4 are shown by points of filled triangle.

DESCRIPTION OF REFERENCE SIGNS

1: Substrate (A)
2: Layer (B)
3: Layer (C)
4: Layer (D)
5: ITO Electrode
6: Transparent Insulating Film
7: MAM Wire

INDUSTRIAL APPLICABILITY

The laminated substrate of the present invention is used suitably for a cover glass-integrated type touch panel in which a decorating layer is required, a cover glass, a display device, or the like.

The invention claimed is:
1. A laminated base material comprising: a substrate (A), and a layer (B) and a layer (C) sequentially laminated on a surface of the substrate (A) such that the layer (B) is interposed between the substrate (A) and the layer (C),
   wherein the substrate (A) has a refractive index nA and the layer (B) has a refractive index nB, such that the refractive indices nA and nB of the substrate (A) and the layer (B) respectively satisfy the relationship of

$$0.6 \geq |nA-nB| \geq 0.1$$

and the layer (C) contains a pigment, wherein the pigment in the layer (C) is a white pigment present in an amount of 20 to 80% by mass, wherein the refractive index nB of the layer (B) is 1.20 to 1.40, and wherein the laminated base material has a lightness L* is in the range of 80≤L*≤99.

2. The laminated base material according to claim 1, wherein a thickness of the layer (B) is 0.1 to 50 μm and a thickness of the layer (C) is 1 to 40 μm.

3. The laminated base material according to claim 1, wherein the layer (B) contains silicon dioxide.

4. The laminated base material according to claim 1, wherein the layer (B) contains at least one of a polysiloxane or an acrylic resin.

5. The laminated base material according to claim 1, wherein the layer (B) contains a compound having a fluorine atom in its structure.

6. The laminated base material according to claim 1, wherein the layer (C) contains at least one of a polysiloxane or an acrylic resin.

7. A cover glass provided with the laminated base material according to claim 1.

8. A touch panel provided with the laminated base material according to claim 1.

9. A method for manufacturing the laminated base material according to claim 1, comprising a photolithography step of using a photosensitive resin composition to form the layer (B).

* * * * *